(12) United States Patent
Bar-Or Tillinger et al.

(10) Patent No.: US 11,616,537 B1
(45) Date of Patent: Mar. 28, 2023

(54) SPATIAL PRECODING FOR INTER SYMBOL INTERFERENCE REDUCTION IN SINGLE CARRIER

(71) Applicant: QUALCOMM Incorporated, San Diego, CA (US)

(72) Inventors: Amit Bar-Or Tillinger, Tel-Aviv (IL); Gideon Shlomo Kutz, Ramat Hasharon (IL); Shay Landis, Hod Hasharon (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/670,117

(22) Filed: Feb. 11, 2022

(51) Int. Cl.
*H04L 23/02* (2006.01)
*H04B 7/0408* (2017.01)
*H04B 7/08* (2006.01)
*H04B 7/06* (2006.01)
*H04B 7/0456* (2017.01)

(52) U.S. Cl.
CPC ......... *H04B 7/0408* (2013.01); *H04B 7/0478* (2013.01); *H04B 7/0695* (2013.01); *H04B 7/0857* (2013.01)

(58) Field of Classification Search
CPC .. H04B 7/0617; H04B 7/0408; H04B 7/0695; H04B 7/0456; H04B 7/0452; H04B 7/0417; H04B 17/12; H04B 7/0697; H04W 16/28; H04W 40/16; H04W 72/082; H04L 5/0023; H04L 27/2602
USPC ......................................... 375/262, 260, 267
See application file for complete search history.

(56) References Cited

U.S. PATENT DOCUMENTS

| 9,712,215 B1* | 7/2017 | Lee ...................... H04B 7/0408 |
| 2015/0048977 A1* | 2/2015 | Khandani ............ H01Q 19/108 343/837 |
| 2018/0006709 A1* | 1/2018 | Peleg ....................... H04B 1/10 |

* cited by examiner

*Primary Examiner* — Khai Tran
(74) *Attorney, Agent, or Firm* — Holland & Hart LLP

(57) ABSTRACT

Methods, systems, and devices for wireless communications are described. Aspects of the present disclosure describe spatial precoding for inter symbol interference reduction in single carrier. Generally, the described techniques provide for one or more wireless devices (e.g., a user equipment (UE) and a network entity) to determine a weighted sum of several beams, each with a different delay, to form a spatial precoder that increases signal to interference noise ratios while improving signaling quality by diversifying the number of beams carrying subsequent messaging. The one or more wireless devices may determine complex gain values and delay parameters based on reference signals. The one or more wireless devices may utilize the complex gain values and delay parameters such that subsequent transmissions may be received coherently over multiple beams.

30 Claims, 13 Drawing Sheets

SPATIAL PRECODING FOR INTER SYMBOL INTERFERENCE REDUCTION IN SINGLE CARRIER

FIELD OF TECHNOLOGY

The following relates to wireless communications, including spatial precoding for inter symbol interference (ISI) reduction in single carrier.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support spatial precoding for inter symbol interference (ISI) reduction in single carrier. Generally, the described techniques provide for one or more wireless devices (e.g., a user equipment (UE) and a network entity) to determine a weighted sum of several beams, each with a different delay to form a spatial precoder that increases (e.g., maximizes) signal to interference noise ratios while improving signaling quality by diversifying the number of beams carrying subsequent messaging. For example, the UE may determine, based on a set of transmit beams at the network entity and a set of receive beams at the UE, complex gain values and delay parameters. The UE may transmit the complex gain values and delay parameters to the network entity (e.g., beam weights) so that the network entity may apply the beam weights such that subsequent transmissions to the UE may be received coherently over multiple beams. Coherently received messages utilizing multiple beams may also provide higher reception SINR, signal-to-noise (SNR), or both (e.g., due to spatial precoder optimization), as well as signaling resilient to blocking, atmospheric attenuation, and the like (e.g., due to multiple beams, which may propagate over multiple paths).

A method for wireless communications at a first wireless device is described. The method may include receiving, from a second wireless device and via a set of receive beams at the first wireless device, a set of reference signals associated with a set of transmit beams at the second wireless device, transmitting, to the second wireless device, a set of parameters indicating a set of complex gain values and a set of delay parameters associated with the set of receive beams and the set of transmit beams, and receiving, from the second wireless device, a message via a coherent receive beam at the first wireless device, the coherent receive beam based on the set complex gain values and the set of delay parameters associated with the set of receive beams and the set of transmit beams.

An apparatus for wireless communications at a first wireless device is described. The apparatus may include a processor, memory coupled with the processor, and instructions stored in the memory. The instructions may be executable by the processor to cause the apparatus to receive, from a second wireless device and via a set of receive beams at the first wireless device, a set of reference signals associated with a set of transmit beams at the second wireless device, transmit, to the second wireless device, a set of parameters indicating a set of complex gain values and a set of delay parameters associated with the set of receive beams and the set of transmit beams, and receive, from the second wireless device, a message via a coherent receive beam at the first wireless device, the coherent receive beam based on the set complex gain values and the set of delay parameters associated with the set of receive beams and the set of transmit beams.

Another apparatus for wireless communications at a first wireless device is described. The apparatus may include means for receiving, from a second wireless device and via a set of receive beams at the first wireless device, a set of reference signals associated with a set of transmit beams at the second wireless device, means for transmitting, to the second wireless device, a set of parameters indicating a set of complex gain values and a set of delay parameters associated with the set of receive beams and the set of transmit beams, and means for receiving, from the second wireless device, a message via a coherent receive beam at the first wireless device, the coherent receive beam based on the set complex gain values and the set of delay parameters associated with the set of receive beams and the set of transmit beams.

A non-transitory computer-readable medium storing code for wireless communications at a first wireless device is described. The code may include instructions executable by a processor to receive, from a second wireless device and via a set of receive beams at the first wireless device, a set of reference signals associated with a set of transmit beams at the second wireless device, transmit, to the second wireless device, a set of parameters indicating a set of complex gain values and a set of delay parameters associated with the set of receive beams and the set of transmit beams, and receive, from the second wireless device, a message via a coherent receive beam at the first wireless device, the coherent receive beam based on the set complex gain values and the set of delay parameters associated with the set of receive beams and the set of transmit beams.

Some examples of the method, apparatuses, and non-transitory computer-readable medium described herein may further include operations, features, means, or instructions for receiving, from the second wireless device, a control message indicating indices corresponding to a set of beam weights associated with the coherent receive beam for the first wireless device based on the set of parameters, where the message may be received based on the set of beam weights.

Some examples of the method, apparatuses, and non-transitory computer-readable medium described herein may further include operations, features, means, or instructions for receiving, from the second wireless device, a control message indicating a spatial precoding, the spatial precoding being applied based on the set of parameters, where the control message may be received based on the set of beam weights.

Some examples of the method, apparatuses, and non-transitory computer-readable medium described herein may further include operations, features, means, or instructions for measuring the set of reference signals received via the set of receive beams based on a first tap in a time domain and determining one or more beam pairs associated with the set of receive beams and the set of transmit beams based on a respective measurement for each beam pair of a set of beam pairs associated with the set of receive beams and the set of transmit beams.

Some examples of the method, apparatuses, and non-transitory computer-readable medium described herein may further include operations, features, means, or instructions for determining the set of complex gain values and the set of delay parameters for the one or more beam pairs and transmitting an indication of the one or more beam pairs to the second wireless device, the one or more beam pairs based on an energy of a strongest tap of the time domain, a ratio between the energy of the strongest tap of the time domain and a summation of energies of other taps, a signal to interference noise ratio, or some combination thereof.

Some examples of the method, apparatuses, and non-transitory computer-readable medium described herein may further include operations, features, means, or instructions for measuring the set of reference signals received via the set of receive beams based on one or more second taps in the time domain, the one or more second taps associated with inter symbol interference at the first wireless device, determining a second set of complex gain values and a second set of delay parameters associated with the one or more second taps, and transmitting, to the second wireless device, the second set of complex gain values and the second set of delay parameters associated with the one or more second taps.

In some examples of the method, apparatuses, and non-transitory computer-readable medium described herein, the coherent receive beam may be associated with a set of beam weights based on the second set of complex gain values and the second set of delay parameters.

Some examples of the method, apparatuses, and non-transitory computer-readable medium described herein may further include operations, features, means, or instructions for receiving, from a third wireless device and via the set of receive beams of the first wireless device, a second set of reference signals associated with a third set of beams of the third wireless device, transmitting, to the third wireless device, a second set of parameters indicating a second set of complex gain values and a second set of delay parameters associated with the set of receive beams, receiving, from the third wireless device, a second control message indicating indices corresponding to a second set of beam weights associated with the coherent receive beam based on the second set of parameters, and receiving, from the third wireless device, at least a portion of the message via the coherent receive beam based on the second control message.

Some examples of the method, apparatuses, and non-transitory computer-readable medium described herein may further include operations, features, means, or instructions for receiving, from a third wireless device and via the set of receive beams of the first wireless device, a second set of reference signals associated with a third set of beams of the third wireless device, transmitting, to the third wireless device, a second set of parameters indicating a second set of complex gain values and a second set of delay parameters associated with the set of receive beams and the third set of beams, receiving, from the third wireless device, a second control message indicating a second spatial precoding, the second spatial precoding being applied based on the second set of parameters, where the second control message may be received based on the set of beam weights, and receiving, from the third wireless device, at least a portion of the message via the coherent receive beam based on the second control message.

A method for wireless communications is described. The method may include transmitting, to a first wireless device, a set of reference signals via a set of transmit beams at the second wireless device, receiving, from the first wireless device, a set of parameters indicating a set of complex gain values and a set of delay parameters associated with a set of receive beams and the set of transmit beams at the first wireless device based on the set of reference signals, and transmitting, to the first wireless device, a message via a combined transmit beam corresponding to a set of beam weights associated with a coherent receive beam for the first wireless device based on the set of complex gain values and the set of delay parameters.

An apparatus for wireless communications is described. The apparatus may include a processor, memory coupled with the processor, and instructions stored in the memory. The instructions may be executable by the processor to cause the apparatus to transmit, to a first wireless device, a set of reference signals via a set of transmit beams at the second wireless device, receive, from the first wireless device, a set of parameters indicating a set of complex gain values and a set of delay parameters associated with a set of receive beams and the set of transmit beams at the first wireless device based on the set of reference signals, and transmit, to the first wireless device, a message via a combined transmit beam corresponding to a set of beam weights associated with a coherent receive beam for the first wireless device based on the set of complex gain values and the set of delay parameters.

Another apparatus for wireless communications is described. The apparatus may include means for transmitting, to a first wireless device, a set of reference signals via a set of transmit beams at the second wireless device, means for receiving, from the first wireless device, a set of parameters indicating a set of complex gain values and a set of delay parameters associated with a set of receive beams and the set of transmit beams at the first wireless device based on the set of reference signals, and means for transmitting, to the first wireless device, a message via a combined transmit beam corresponding to a set of beam weights associated with a coherent receive beam for the first wireless device based on the set of complex gain values and the set of delay parameters.

A non-transitory computer-readable medium storing code for wireless communications is described. The code may include instructions executable by a processor to transmit, to a first wireless device, a set of reference signals via a set of transmit beams at the second wireless device, receive, from the first wireless device, a set of parameters indicating a set of complex gain values and a set of delay parameters associated with a set of receive beams and the set of transmit beams at the first wireless device based on the set of reference signals, and transmit, to the first wireless device, a message via a combined transmit beam corresponding to a set of beam weights associated with a coherent receive beam for the first wireless device based on the set of complex gain values and the set of delay parameters.

Some examples of the method, apparatuses, and non-transitory computer-readable medium described herein may further include operations, features, means, or instructions for determining the set of beam weights associated with the coherent receive beam for the first wireless device based on the set of transmit beams and the set of parameters.

Some examples of the method, apparatuses, and non-transitory computer-readable medium described herein may further include operations, features, means, or instructions for transmitting, to the first wireless device, a control message indicating the set of beam weights associated with the coherent receive beam for the first wireless device.

Some examples of the method, apparatuses, and non-transitory computer-readable medium described herein may further include operations, features, means, or instructions for receiving, from the first wireless device, an indication of one or more signal to interference and noise ratios associated with the set of complex gain values and the set of delay parameters associated with one or more beam pairs and determining a spatial precoder based at least in part the indication of the one or more signal to interference and noise ratios associated with the set of complex gain values and the set of delay parameters associated with the one or more beam pairs.

In some examples of the method, apparatuses, and non-transitory computer-readable medium described herein, transmitting the message may include operations, features, means, or instructions for transmitting the message in accordance with the spatial precoder.

Some examples of the method, apparatuses, and non-transitory computer-readable medium described herein may further include operations, features, means, or instructions for receiving, from the first wireless device, an indication of one or more beam pairs associated with the set of receive beams, the combined transmit beam, and the set of transmit beams, the indication of the one or more beam pairs based on a respective measurement for each beam pair of a set of beam pairs and a first tap in a time domain.

Some examples of the method, apparatuses, and non-transitory computer-readable medium described herein may further include operations, features, means, or instructions for receiving, from the first wireless device, a second set of complex gain values and a second set of delay parameters associated with one or more second taps, where the second set of complex gain values and the second set of delay parameters may be based on measurements associated with the set of reference signals via one or more second taps in the time domain, the one or more second taps associated with inter symbol interference at the first wireless device.

Some examples of the method, apparatuses, and non-transitory computer-readable medium described herein may further include operations, features, means, or instructions for determining the set of beam weights associated with the coherent receive beam for the first wireless device based on the second set of complex gain values and the second set of delay parameters.

DETAILED DESCRIPTION

Some wireless communications systems, such as sub terahertz (sub-THz) systems, may utilize analog beamforming to directionally transmit one or more messages. For example, a network entity and a user equipment (UE) may utilize respective transmit and receive beams via respective antenna arrays to acquire, optimize, and utilize beamformed communication links to support high throughput and low latency transmissions. During such procedures, the UE and the network entity may optimize beamforming link quality by determining a transmit and receive beam pair that is suitable for given channel propagation conditions. However, selecting a single transmit and receive beam pair may be vulnerable to atmospheric attenuation, blockage, and power limitations at the UE.

Aspects of the present disclosure provide for one or more wireless devices (e.g., a UE and a network entity) to determine a weighted sum of several beams, each with a different delay to form a spatial precoder that increases (e.g., maximizes) one or more signal quality parameters (e.g., signal to interference noise ratio (SINR)) while improving signaling quality by diversifying the number of beams carrying subsequent messaging. For example, the UE may determine, based on a set of transmit beams at the network entity and a set of receive beams at the UE, complex gain values and delay parameters. The UE may transmit the complex gain values and delay parameters to the network entity (e.g., beam weights) so that the network entity may apply the beam weights such that subsequent transmissions to the UE may be received coherently over multiple beams. Coherently received messages utilizing multiple beams may also provide higher reception SINR, signal-to-noise (SNR), or both (e.g., due to spatial precoder optimization), as well as signaling resilient to blocking, atmospheric attenuation, and the like (e.g., due to multiple beams, which may propagate over multiple paths).

Aspects of the disclosure are initially described in the context of wireless communications systems. Aspects of the disclosure are further illustrated by and described with reference to coherent combining schemes and a process flow. Aspects of the disclosure are further illustrated by and described with reference to apparatus diagrams, system diagrams, and flowcharts that relate to spatial precoding for inter symbol interference (ISI) reduction in single carrier.

Figure 1:
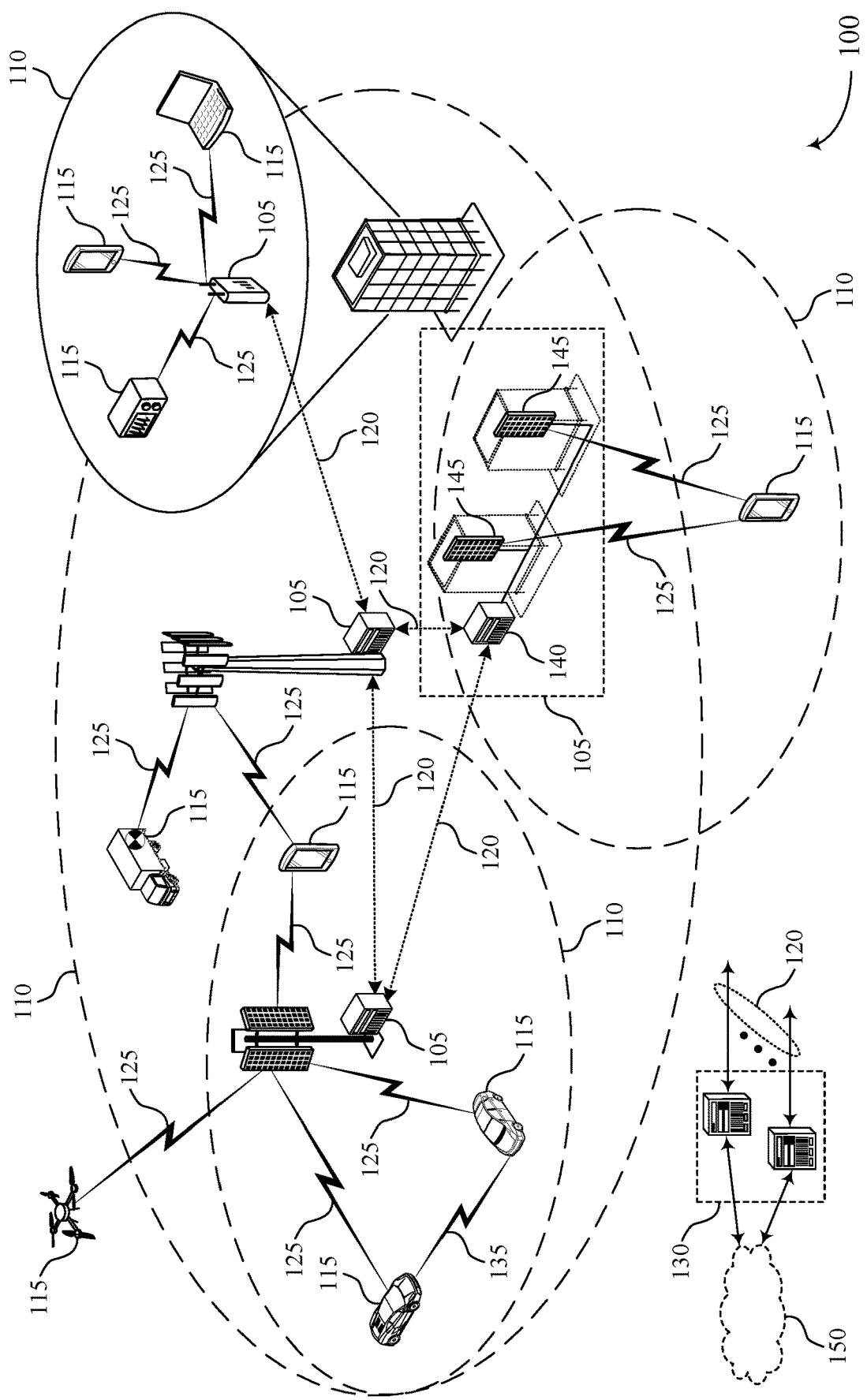
FIG. 1 illustrates an example of a wireless communications system that supports spatial precoding for inter symbol interference (ISI) reduction in single carrier in accordance with aspects of the present disclosure.

FIG. 1 illustrates an example of a wireless communications system 100 that supports spatial precoding for ISI reduction in single carrier in accordance with aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The network entities 105 may be dispersed throughout a geographic area to form the wireless communications system 100 and may be devices in different forms or having different capabilities. The network entities 105 and the UEs 115 may wirelessly communicate via one or more communication links 125. Each network entity 105 may provide a coverage area 110 over which the UEs 115 and the network entity 105 may establish one or more communication links 125. The coverage area 110 may be an example of a geographic area over which a network entity 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, network entity 105, entity of a core network 130, apparatus, device, or computing system configured to perform any techniques described herein. For example, a network node may be a UE 115. As another example, a network node may be a network entity 105. As another example, a first network node may be configured to communicate with a second network node or a third network node. In one aspect of this example, the first network node may be a UE 115, the second network node may be a network entity 105, and the third network node may be a UE 115. In another aspect of this example, the first network node may be a UE 115, the second network node may be a network entity 105, and the third network node may be a network entity 105. In yet other aspects of this example, the first, second, and third network nodes may be different. Similarly, reference to a UE 115, a network entity 105, an apparatus, a device, or a computing system may include disclosure of the UE 115, network entity 105, apparatus, device, or computing system being a network node. For example, disclosure that a UE 115 is configured to receive information from a network entity 105 also discloses that a first network node is configured to receive information from a second network node. In this example, consistent with this disclosure, the first network node may refer to a first UE 115, a first network entity 105, a first apparatus, a first device, or a first computing system configured to receive the information; and the second network node may refer to a second UE 115, a second network entity 105, a second apparatus, a second device, or a second computing system.

The network entities 105 may communicate with the core network 130, or with one another, or both. For example, the network entities 105 may interface with the core network 130 through one or more backhaul links 120 (e.g., via an S1, N2, N3, or other interface). The network entities 105 may communicate with one another over the backhaul links 120 (e.g., via an X2, Xn, or other interface) either directly (e.g., directly between network entities 105), or indirectly (e.g., via core network 130), or both. In some examples, the backhaul links 120 may be or include one or more wireless links.

One or more of the network entities 105 described herein may include or may be referred to by a person having ordinary skill in the art as a base transceiver station, a radio network entity, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay network entities, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Some wireless communications systems, such as sub-THz systems may heavily utilize analog beamforming, where one or more wireless devices utilize arrays of antenna elements, combined with configurable phase shifters and attenuators, to create selective radiation patterns (e.g., beams) in azimuth and elevation. In such cases, optimizing link quality for said beams may be performed by determining a beam pair (e.g., beam pair associated with a highest SINR or SNR, or SINR, SNR above a threshold, or the like) between the one or more wireless devices. For example, a gNodeB (gNB) and a UE may determine a transmission and receive beam pair that is suitable for given channel propagation conditions.

In some cases, the UE and the gNB may utilize a single carrier waveform for beamforming and communication. However, wireless devices communicating via single carrier waveforms may perform time domain equalization, which may consume excess power during operations. For example, the UE may utilize a number of channel tap delay lines (TDLs) (e.g., extracting one or more signal outputs from different points within a given amount of time) to characterize a single carrier waveform signal. That is, the UE may evaluate properties of one or more taps over a delay spread of a channel (e.g., a difference between a time of arrival of an earliest signal component, such as in line-of-sight (LOS) communication, and the time of arrival of a latest component, such as a multipath component). As a single carrier waveform signal may take multiple paths to the UE, the UE may evaluate properties associated with a number of channel taps over the channel's delay spread to perform power equalization across the signal's spread delay. That is, the UE may estimate channel propagation for a given channel and, based on the estimation, compensate for observed propagation influences via equalization. Such compensations may therefore reduce observed propagation influences, which may result in increased signaling quality at the UE (e.g., higher SINR, SNR, and the like). As such, the number of taps and the signal's spread delay may be proportional to power consumption at the UE.

Additionally, the UE may utilize cluster delay lines (CDLs), which may correspond to temporal and spatial taps of several beams for subsequent beamformed communications. In such cases, a channel is modeled as a set of clusters, where each cluster may be associated with a delay, an average power, and a spatial direction of both transmission and reception. Received power from each cluster may depend on cluster power multiplied spatially with transmission and reception beam patterns based on one or more measurements. For example, the received power may depend on angles of departure (AoD), angles of arrival (AoA), zenith angles of departure (ZoD), zenith angles of arrival (ZoA), or a combination thereof.

Based on each cluster, the UE may determine a cluster (e.g., strongest cluster) that may be spatially separated from one another and apply a beam pattern associated with the cluster for reception. In such cases, as the applied beam pattern is narrower (e.g., when directed to a cluster direction) relative to utilizing more than one cluster, a delay spread associated with the cluster may be smaller, as the rest of the clusters of each cluster received at the UE may be filtered out.

Aspects of the present disclosure provide for one or more wireless devices (e.g., a UE and a network entity) to determine a weighted sum of several beams, each with a different delay to form a spatial precoder that increases (e.g., maximizes) signal to interference noise ratios while improving signaling quality by diversifying the number of beams carrying subsequent messaging. For example, the UE may determine, based on a set of transmit beams at the network entity and a set of receive beams at the UE, complex gain values and delay parameters. The UE may transmit the complex gain values and delay parameters to the network entity (e.g., beam weights) so that the network entity may apply the beam weights such that subsequent transmissions to the UE may be received coherently over multiple beams. Coherently received messages utilizing multiple beams may also provide higher reception SINR, signal-to-noise (SNR), or both (e.g., due to spatial precoder optimization), as well as signaling resilient to blocking, atmospheric attenuation, and the like (e.g., due to multiple beams, which may propagate over multiple paths).

Figure 2:
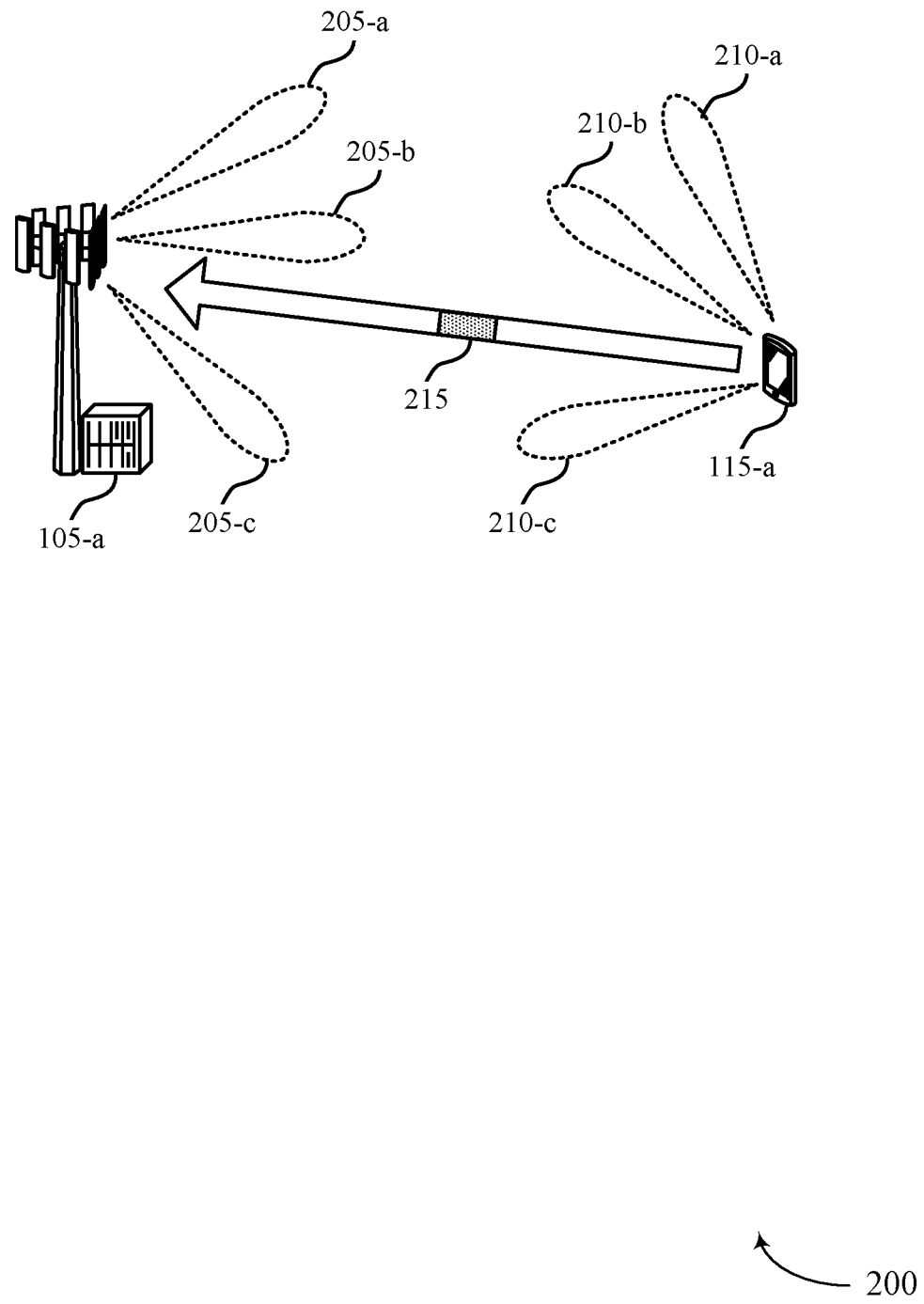
FIG. 2 illustrates an example of a wireless communication system that supports spatial precoding for ISI reduction in single carrier in accordance with aspects of the present disclosure.

FIG. 2 illustrates an example of a wireless communications system 200 that supports spatial precoding for ISI reduction in single carrier in accordance with aspects of the present disclosure. The wireless communications system 200 may include a UE 115-a and a network entity 105-a, which may be examples of the UE 115 and the network entity 105 as illustrated in FIG. 1.

The network entity 105-a may utilize a set of transmit beams 205 to perform beamforming procedures such as beam acquisition, beam refinement, beamed communications, and the like with the UE 115-a. Likewise, the UE 115-a may utilize a set of receive beams 210 to perform procedures such as beam acquisition, beam refinement, beamed communications, and the like with the network entity 105-a. In some examples, such as described by aspects of the present disclosure, the wireless communications system 200 may perform beamforming procedures based on a weighted sum of one or more beams of the set of receive beams 210 and the set of transmit beams 205. Such a weighted sum may be accomplished by utilizing different delays and complex gain values for the set of transmit beams 205 and the set of receive beams 210 such that one or more beams of the set of transmit beams 205 may be coherently combined, as well as coherently received via the set of receive beams 210.

For example, the network entity 105-a may transmit a first transmit beam 205-a, a second transmit beam 205-b, and a third transmit beam 205-c. The UE 115-a may receive the first transmit beam 205-a via a first receive beam 210-a, the second transmit beam 205-b via a second receive beam 210-b, and the third transmit beam 205-c via a third receive beam 210-c. In some examples, the UE 115-a may also receive a set of reference signals associated with the set of transmit beams 205.

Based on the set of receive beams 210, the set of transmit beams 205, and the set of reference signals, the UE 115-a may determine a set of parameters associated with the set of receive beams 210 and the set of transmit beams 205. For example, the UE 115-a may determine a set of delay parameters and a set of complex gain values based on the set of receive beams 210 and the set of transmit beams 205. Based on the set of receive beams 210, the set of receive beams 205, and the set of reference signals, the UE 115-a may transmit an indication 215 to the network entity 105-a indicating the set of delay parameters and the set of complex gain values.

The network entity 105-a may receive the indication 215, including indications of the set of complex gain values and the set of delay parameters, such that the network entity 105-a may determine a weighted combination of beams associated with the set of receive beams 210 and the set of transmit beams 205 such that the weighted combination may be received coherently at the UE 115-a. For example, the network entity 105-a may apply a first complex gain value and a first delay parameter to the first transmit beam 205-a and a second complex gain value and a second delay parameter to the second transmit beam 205-b such that, when combined, a message transmitted via a weighted combination of the first transmit beam 205-a and the second transmit beam 205-b may be received coherently at the UE 115-a (e.g., via the first receive beam 210-a and the third receive beam 210-c).

Figure 3:
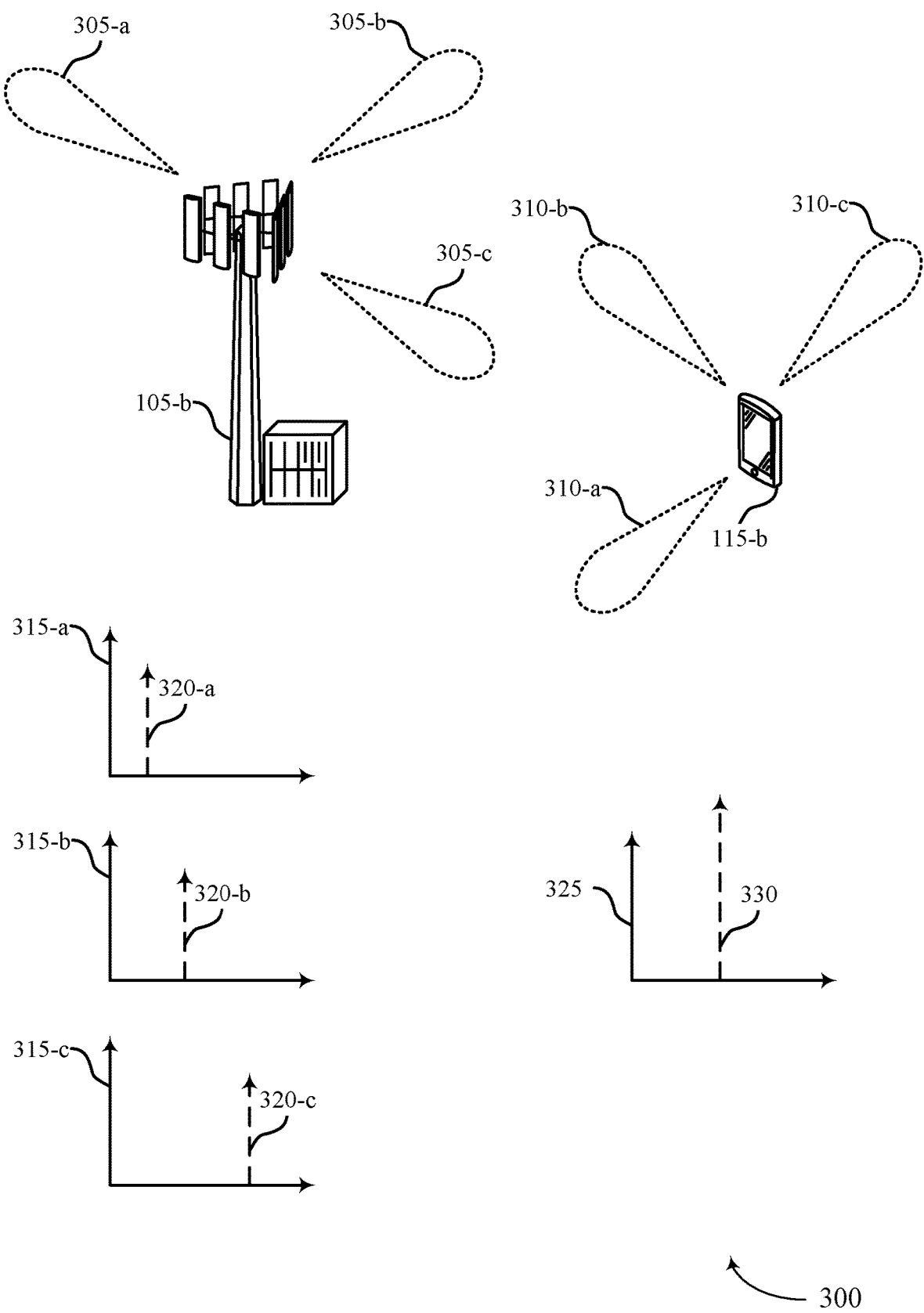
FIG. 3 illustrates an example of a coherent combining scheme that supports spatial precoding for ISI reduction in single carrier in accordance with aspects of the present disclosure.

FIG. 3 illustrates an example of a coherent combining scheme 300 that supports spatial precoding for ISI reduction in single carrier in accordance with aspects of the present disclosure. The coherent combining scheme 300 is described with reference to a UE 115-*b* and a network entity 105-*b*, which may be examples of the UE 115 and the network entity 105 as described with reference to FIGS. 1 and 2.

The network entity 105-*b* and the UE 115-*b* may perform one or more beam procedures to utilize a single carrier waveform to transmit information, from the network entity 105-*b*, over multiple beams such that a message transmitted over the single carrier waveform is received coherently at the UE 115-*b*. In such cases, the network entity 105-*b* and the UE 115-*b* may utilize clusters and delay line taps to determine parameters such that multiple beams may be received coherently at the UE 115-*b*.

For example, the network entity 105-*b* may utilize a first set of transmit beams 305-*a* associated with a first transmit cluster, a second set of receive beams 305-*b* associated with a second transmit cluster, and a third set of receive beams 305-*c* associated with a third transmit cluster for a subsequent beam procedure. Likewise, the UE 115-*b* may utilize a first set of receive beams 310-*a* associated with a first receive cluster, a second set of receive beams 310-*b* associated with a second receive cluster, and a third set of receive beams 310-*c* associated with a third receive cluster for the subsequent beam procedure. In some cases, the UE 115-*b* may select a transmit and receive beam pair that increases (e.g., maximizes) a metric (e.g., SINR, SNR). In other cases, such as those described by the present disclosure, the UE 115-*b* may determine a weighted sum of several beams (e.g., of the transmit beams 305 and the receive beams 310), each with different delays, to form a spatial precoder that may maximize the metric while improving spatial diversity, resulting in a more resilient solution against directional blockers, among other adverse phenomena in wireless communications.

As part of the beam procedure, the UE 115-*b* may identify strongest directional beam pairs (e.g., based on SINR, SNR, ratio between energy of strongest tap) associated with the single carrier waveform with a dominant tap in the time domain (e.g., flatness in a frequency domain). In other words, the UE 115-*b* will measure, at points in time, each of the first set of transmit beams 305-*a*, the second set of transmit beams 305-*b*, and the third set of transmit beams 305-*c* using the first set of receive beams 310-*a*, the second set of receive beams 310-*b*, and the third set of receive beams 310-*c*.

Based on identifying the strongest directional beam pairs, the UE 115-*b* may measure significant tap complex gain and delay parameters for the beam procedure. For example, the UE 115-*b* may utilize a first tap to obtain a first time domain channel response 315-*a*, associated with the first set of transmit beams 305-*a* and the first set of receive beams 310-*a* (e.g., a first beam pair). The UE 115-*b* may utilize the first time domain channel response 315-*a* to obtain a dominant tap to measure a first complex gain value 320-*a* and a first delay associated with the first set of transmit beams 305-*a* (e.g., via an SINR measurement, SNR measurement, or the like). Likewise, the UE 115-*b* may utilize a second tap to obtain a second time domain channel response 315-*b*, associated with the second set of transmit beams 305-*b* and the second set of receive beams 310-*b* (e.g., a second beam pair). The UE 115-*b* may utilize the second time domain channel response 315-*b* to obtain a dominant tap to measure a second complex gain value 320-*b* and a second delay associated with the second set of transmit beams 305-*b*. Lastly, the UE 115-*b* may utilize a third tap to obtain a third time domain channel response 315-*c*, associated with the third set of transmit beams 305-*c* and the third set of receive beams 310-*c* (e.g., a third beam pair). The UE 115-*b* may utilize the third time domain channel response 315-*c* to obtain a dominant tap to measure a third complex gain value 320-*c* and a third delay associated with the third set of transmit beams 305-*c*.

Put another way, the UE 115-*b* may measure, during a delay spread associated with the transmit beams 305, what beams of the transmit beams 305 arrive at what times (e.g., delays) along with associated complex gains for the beams. For example, the second set of transmit beams 305-*b* may be associated with LOS communications and arrive first at the UE 115-*b* with a relatively high complex gain. The first set of transmit beams 305-*a* may be associated with a non-LOS (NLOS) communication that travels over a relatively short path and therefore arrives just after the second set of transmit beams 305-*b* with a relatively lower complex gain. Lastly, the third set of transmit beams 305-*c* may be associated with an NLOS communication that travels over a relatively large path and therefore arrives later (e.g., a few microseconds) than the first set of transmit beams 305-*a* and the second set of transmit beams 305-*b* with a complex gain relatively lower than both the first set of transmit beams 305-*a* and the second set of transmit beams 305-*b*.

Based on the taps and measurements, the UE 115-*b* may report the complex gain values and delays associated with the transmit beams 305 (e.g., with respect to the receive beams 310) as sets of parameters to the network entity 105-*b*. For example, the UE 115-*b* may report the first complex gain value as $g_1$ and the first delay as r to the network entity 105-*b* within a set of parameters, an indication of the set of parameters, or both. Likewise, the UE 115-*b* may report the second and third complex gain values as $g_2$ and $g_3$, respectively, and the second and third delay as $\tau_2$ and $\tau_3$, respectively, in the set of parameters, the indication of the set of parameters, or both.

Based on the set of parameters, the network entity 105-*b* may utilize the first, second, and third delays as well as the first, second, and third complex gain values to transmit a signal using intensified transmit beams by applying conjugate values of the first, second, and third complex gain values as well as corresponding negative delay values (e.g., with respect to the first, second, and third delays) such that the intensified transmit beams are received coherently at the UE 115-*b*. For example, the UE 115-*b* may receive coherently combined transmit beams, which may correspond to a fourth time domain channel response 325 with an associated complex gain 330 (e.g., via an SINR measurement, SNR measurement, or the like), which may be associated with the coherently combined transmit beams at the UE 115-*b*.

Put another way, using the set of parameters, may compensate for variations in arrival time of the transmit beams 305 at the UE 115-*b* by applying the negative delay values such that each of the transmit beams 305 are received simultaneously or otherwise coherently at the UE 115-*b*. Likewise, the network entity 105-*b* may compensate for variations in received power of the transmit beams 305 at the UE 115-*b* by applying conjugate gain values such that power of the transmit beams 305 at the UE 115-*b* are equalized or otherwise normalized to enable coherent reception of a combined beam made up of the transmit beams 305.

In some examples, the network entity 105-*b* may signal, to the UE 115-*b*, when the combined beam is prepared, which may enable the UE 115-*b* to receive the combined beam coherently. In some cases, multiple wireless devices (e.g., multiple network entities 105, multiple TRPs, or the like) may transmit different transmit beams of the transmit beams 305.

Figure 4:
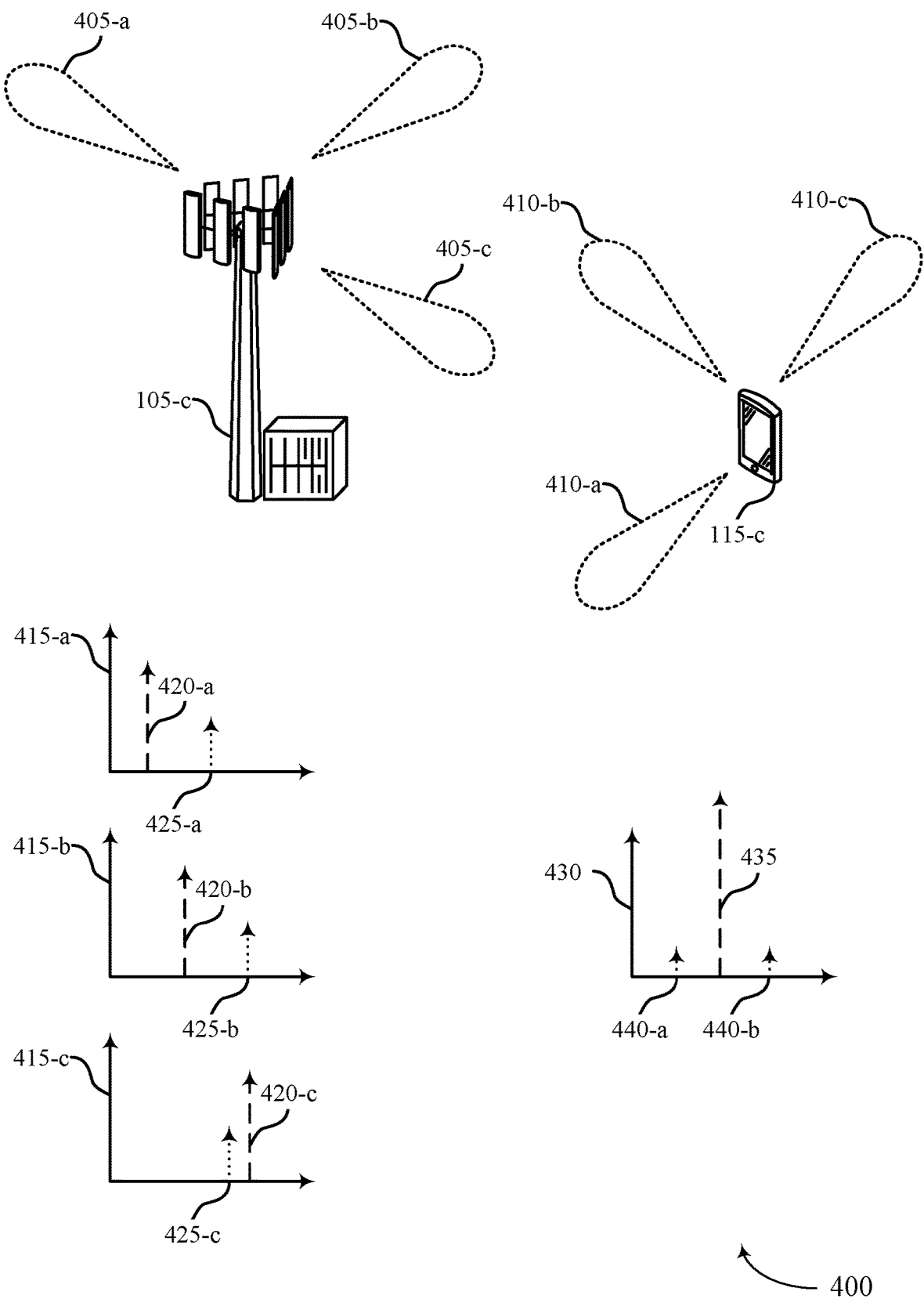
FIG. 4 illustrates an example of a coherent combining scheme that supports spatial precoding for ISI reduction in single carrier in accordance with aspects of the present disclosure.

FIG. 4 illustrates an example of a coherent combining scheme 400 that supports spatial precoding for ISI reduction in single carrier in accordance with aspects of the present disclosure. The coherent combining scheme 400 is described with reference to a UE 115-*b* and a network entity 105-*b*, which may be examples of the UE 115 and the network entity 105 as described with reference to FIGS. 1-3.

The network entity 105-*c* and the UE 115-*c* may perform one or more beam procedures to utilize a single carrier waveform to transmit information, from the network entity 105-*c*, over multiple beams such that a message transmitted over the single carrier waveform is received coherently at the UE 115-*c*. In such cases, the network entity 105-*c* and the UE 115-*c* may utilize clusters and delay line taps to determine parameters such that multiple beams may be received coherently at the UE 115-*c*.

For example, the network entity 105-*c* may utilize a first set of transmit beams 405-*a* associated with a first transmit cluster, a second set of transmit beams 405-*b* associated with a second transmit cluster, and a third set of transmit beams 405-*c* associated with a third transmit cluster for a subsequent beam procedure. Likewise, the UE 115-*c* may utilize a first set of receive beams 410-*a* associated with a first receive cluster, a second set of receive beams 410-*b* associated with a second receive cluster, and a third set of receive beams 410-*c* associated with a third receive cluster for the subsequent beam procedure. In some cases, the UE 115-*c* may select a transmit and receive beam pair that increases (e.g., maximizes) a metric (e.g., SINR, SNR). In other cases, such as those described by the present disclosure, the UE 115-*c* may determine a weighted sum of several beams (e.g., of the transmit beams 405 and the receive beams 410), each with different delays, to form a spatial precoder that may maximize the metric while improving spatial diversity, resulting in a more resilient solution against directional blockers, among other adverse phenomena in wireless communications.

As part of the beam procedure, the UE 115-*c* may identify strongest directional beam pairs (e.g., based on SINR, SNR, ratio between energy of strongest tap) associated with the single carrier waveform with a dominant tap in the time domain (e.g., flatness in a frequency domain) as well as additional taps. In other words, the UE 115-*c* will measure, at points in time, each of the first set of transmit beams 405-*a*, the second set of transmit beams 405-*b*, and the third set of transmit beams 405-*c* using the first set of receive beams 410-*a*, the second set of receive beams 410-*b*, and the third set of receive beams 410-*c*, as well as other taps to detect inter symbol interference.

Based on identifying the strongest directional beam pairs, the UE 115-*c* may measure significant tap complex gain and delay parameters for the beam procedure. For example, the UE 115-*b* may utilize a first tap to obtain a first time domain channel response 415-*a*, associated with the first set of transmit beams 405-*a* and the first set of receive beams 410-*a* (e.g., a first beam pair). The UE 115-*c* may utilize the first time domain channel response 415-*a* to obtain a dominant tap to measure a first complex gain value 420-*a* and a first delay associated with the first set of transmit beams 405-*a* (e.g., via an SINR measurement, SNR measurement, or the like). In some cases, the UE 115-*c* may also measure ISI, such as a first ISI 425-*a* associated with one or more of the additional taps. Likewise, the UE 115-*c* may utilize a second tap to obtain a second time domain channel response 415-*b*, associated with the second set of transmit beams 405-*b* and the second set of receive beams 410-*b* (e.g., a second beam pair). The UE 115-*c* may utilize the second time domain channel responses 415-*b* to obtain a dominant tap to measure a second complex gain value 420-*b* and a second delay associated with the second set of transmit beams 405-*b*. In some cases, the UE 115-*c* may measure a second ISI 425-*b* associated with the second tap. Lastly, the UE 115-*b* may utilize a third tap to obtain a third time domain channel response 415-*c*, associated with the third set of transmit beams 405-*c* and the third set of receive beams 410-*c* (e.g., a third beam pair). The UE 115-*c* may utilize the third time domain channel responses 415-*c* to obtain a dominant tap to measure a third complex gain value 420-*c* and a third delay associated with the third set of transmit beams 405-*c*. In some cases, the UE 115-*c* may measure a third ISI 425-*c* associated with the third tap.

Based on the taps and measurements, the UE 115-*c* may report the complex gain values and delays associated with the transmit beams 405 (e.g., with respect to the receive beams 410) as sets of parameters to the network entity 105-*c* (e.g., beam weights). In other cases, the network entity 105-*c* may determine the beam weights based on the dominant tap and one or more second taps (e.g., parameters indicated by the UE 115-*c*). For example, the UE 115-*c* may report the first complex gain value as $g_1$ and the first delay as $\tau_1$ to the network entity 105-*c* within a set of parameters, an indication of the set of parameters, or both. Additionally, the UE 115-*c* may utilize one or more second taps to report a first ISI complex gain value as $g_{1,2}$ and a first ISI delay of $\tau_{1,2}$ (e.g., if the second tap leaks, or interferes, with the first tap). Likewise, the UE 115-*c* may report the second and third complex gain values as $g_2$ and $g_3$, respectively, and the second and third delay as $\tau_2$ and $\tau_3$, respectively, in the set of parameters, the indication of the set of parameters, or both. Additionally, the UE 115-*c* may utilize one or more second taps to report a second ISI complex gain value, a second ISI delay value, a third ISI complex gain value, and a third ISI delay value. Additionally, the UE 115-*c* may transmit an indication of one or more beam pairs associated with the transmit beams 405, the receive beams 410, or both. In some examples, the one or more beam pairs may be based on an energy of a strongest tap of the time domain, a ratio between the energy of the strongest tap and a summation of energies of other taps (e.g., the one or more second taps), an SINR, or a combination thereof.

Based on the set of parameters, the network entity 105-*c* may implement the set of beam weights by utilizing the first, second, and third delays, the first, second, and third complex gain values, and the first, second, and third ISI delay and complex gain values to transmit a signal using intensified transmit beams by applying conjugate values of the first, second, and third complex gain values as well as corresponding negative delay values (e.g., with respect to the first, second, and third delays) such that the intensified transmit beams are received coherently at the UE 115-*c*.

Additionally, the network entity 105-*c* may utilize the first, second, and third ISI delay and complex gain values to compensate for detected ISI (e.g., by applying parameters such that the detected ISI is cancelled out or minimized). Based on the set of parameters and operations at the network entity 105-*c*, the UE 115-*c* may receive coherently combined transmit beams, which may correspond to a fourth time domain channel responses 430 with an associated complex gain 435, which may be associated with the coherently combined transmit beams at the UE 115-*c* (e.g., via an SINR measurement, SNR measurement, or the like). Additionally, the UE 115-*c* may experience minimized or cancelled ISI 440-*a* and 440-*b* when receiving the coherently combined transmit beams.

In some examples, the network entity 105-*c* may signal, to the UE 115-*c*, when the combined beam is prepared, which may enable the UE 115-*c* to receive the combined beam coherently. In some cases, multiple wireless devices (e.g., multiple network entities 105, multiple TRPs, or the like) may transmit different transmit beams of the transmit beams 405. Additionally, the network entity 105-*c* may determine and subsequently transmit, to the UE 115-*c*, an indication of a spatial precoder that may reduce ISI when the UE 115-*c* coherently receives the combined beam based on the received set of parameters (e.g., beam parameters associated with the dominant tap and the one or more second taps). Based on the indication, the network entity 105-*c* may transmit (e.g., via a combined transmit beam) a message over the transmit beams 405 in accordance with the spatial precoder.

Figure 5:
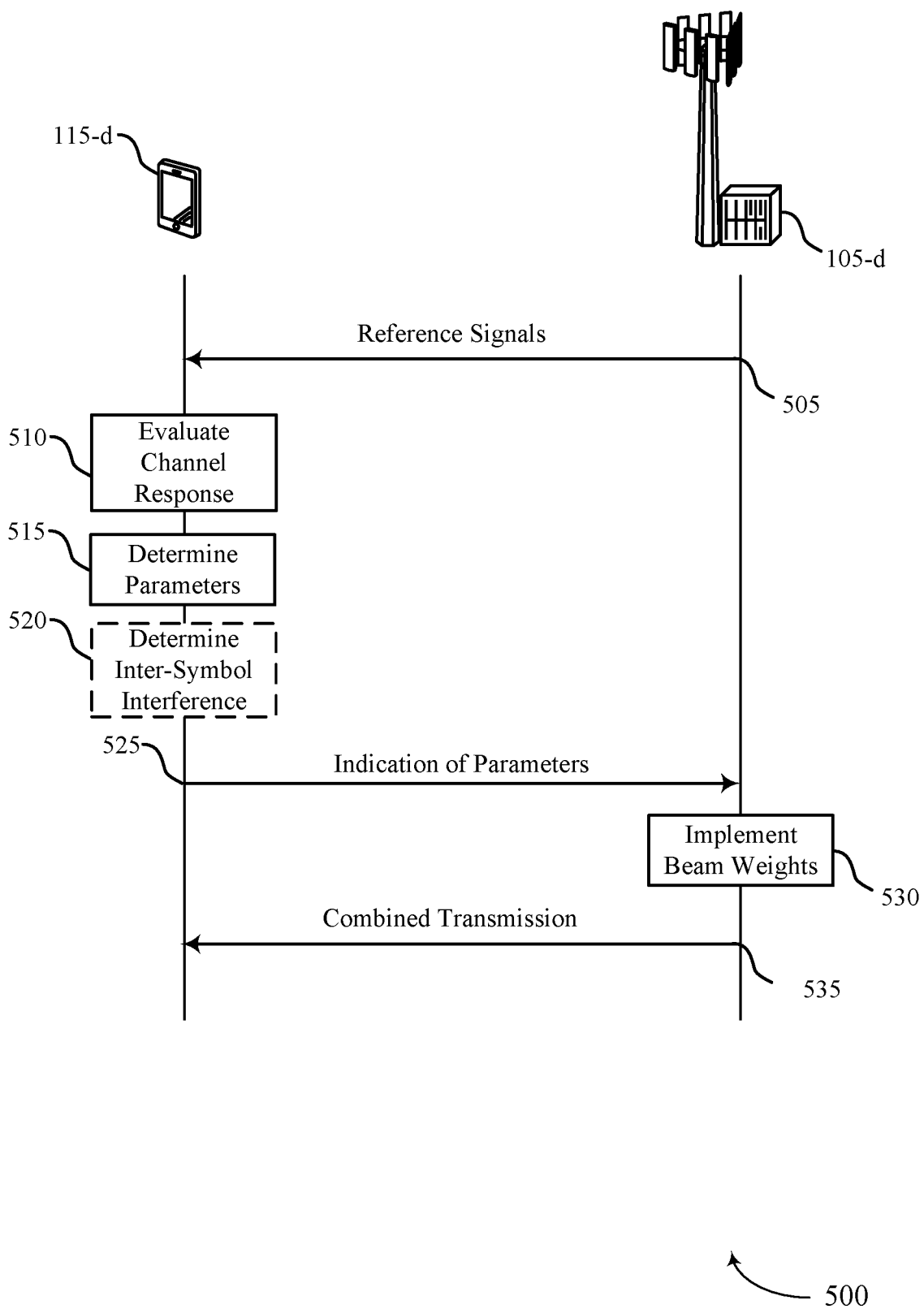
FIG. 5 illustrates an example of a process flow that supports spatial precoding for ISI reduction in single carrier in accordance with aspects of the present disclosure.

FIG. 5 illustrates an example of a process flow 500 that supports spatial precoding for ISI reduction in single carrier in accordance with aspects of the present disclosure. The process flow may be implemented by a UE 115-*d* and a network entity 105-*d*, which may be examples of UES 115 and network entities 105 as described with reference to FIGS. 1-4. It should be noted that, while specific steps are illustrated in the process flow 500, additional steps and may added or removed, and may occur in different orders.

At 505, the network entity 105-*d* may transmit, via a set of transmit beams, reference signals to the UE 115-*d*. The UE 115-*d* may receive the reference signals via a set of receive beams. At 510, the UE 115-*d* may evaluate channel responses associated with the set of transmit beams and the set of receive beams to measure one or more parameters associated with the set of transmit beams. That is, the UE 115-*d* may perform channel estimation, as well as noise and interference estimation, for the channels associated with the set of transmit beams and the set of receive beams. In some cases, the UE 115-*d* may evaluate properties of one or more additional taps to aid in identifying ISI.

At 515, the UE 115-*d* may determine parameters associated with the dominant tap. For example, the UE 115-*d* may determine a set parameters including a set of complex gain values and a set of delays associated with the set of reference signals and, therefore, the set of transmit beams. Optionally, at 520, the UE 115-*d* may determine ISI based on the dominant tap, the one or more additional taps, or both. In some cases, the UE 115-*d* may determine a spatial precoder to reduce ISI.

Based on the determined parameters, at 525, the UE 115-*d* may transmit an indication of parameters, an indication of the spatial precoder, or both to the network entity 105-*d*. In some cases, the UE 115-*d* may transmit an indication of beam weights to the network entity 105-*d*. The network entity 105-*d* may receive the indication of parameters from the UE 115-*d*. Based on the indication of parameters, and whether the UE 115-*d* indicated beam weights, at 530, the network entity 105-*d* may determine and subsequently implement beam weights for a combined transmit beam such that the combined transmit beam is received coherently at the UE 115-*d*. Based on the implemented beam weights, at 535, the network entity 105-*d* may transmit a combined transmission to the UE 115-*d*.

Figure 6:
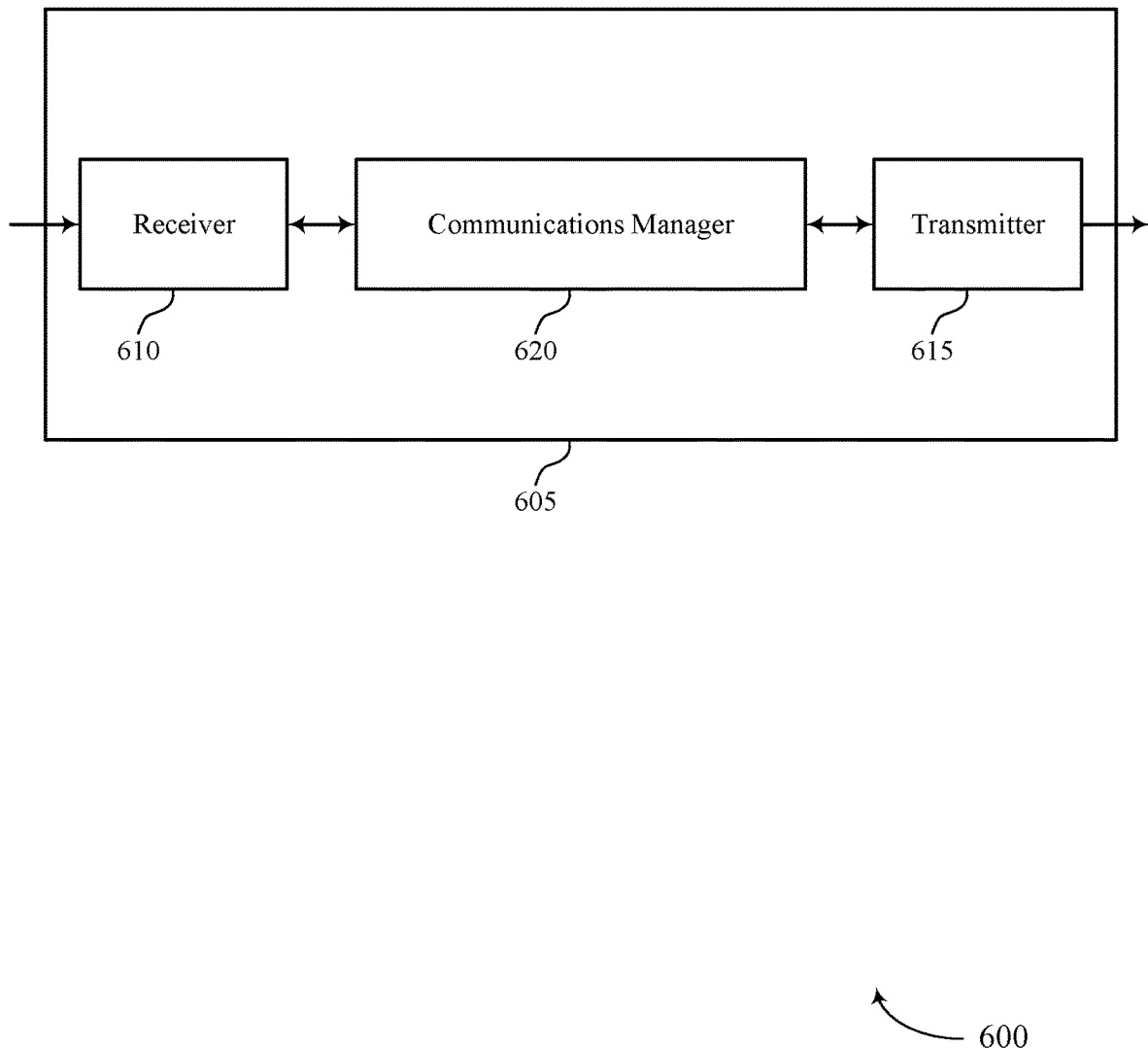
FIGS. 6 and 7 show block diagrams of devices that support spatial precoding for ISI reduction in single carrier in accordance with aspects of the present disclosure.

FIG. 6 shows a block diagram 600 of a device 605 that supports spatial precoding for ISI reduction in single carrier in accordance with aspects of the present disclosure. The device 605 may be an example of aspects of a wireless device as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to spatial precoding for ISI reduction in single carrier). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to spatial precoding for ISI reduction in single carrier). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of spatial precoding for ISI reduction in single carrier as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first wireless device in accordance with examples as disclosed herein. For example, the communications manager 620 may be configured as or otherwise support a means for receiving, from a second wireless device and via a set of receive beams at the first wireless device, a set of reference signals associated with a set of transmit beams at the second wireless device. The communications manager 620 may be configured as or otherwise support a means for transmitting, to the second wireless device, a set of parameters indicating a set of complex gain values and a set of delay parameters associated with the set of receive beams and the set of transmit beams. The communications manager 620 may be configured as or otherwise support a means for receiving, from the second wireless device, a message via a coherent receive beam at the first wireless device, the coherent receive beam based on the set complex gain values and the set of delay parameters associated with the set of receive beams and the set of transmit beams.

Additionally or alternatively, the communications manager 620 may support wireless communications in accordance with examples as disclosed herein. For example, the communications manager 620 may be configured as or otherwise support a means for transmitting, to a first wireless device, a set of reference signals via a set of transmit beams at the second wireless device. The communications manager 620 may be configured as or otherwise support a means for receiving, from the first wireless device, a set of parameters indicating a set of complex gain values and a set of delay parameters associated with a set of receive beams and the set of transmit beams at the first wireless device based on the set of reference signals. The communications manager 620 may be configured as or otherwise support a means for transmitting, to the first wireless device, a message via a combined transmit beam corresponding to a set of beam weights associated with a coherent receive beam for the first wireless device based on the set of complex gain values and the set of delay parameters.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, more efficient utilization of communication resources by utilizing a combined transmit beam such that the combined transmit beam is received coherently by a receiving device.

Figure 7:
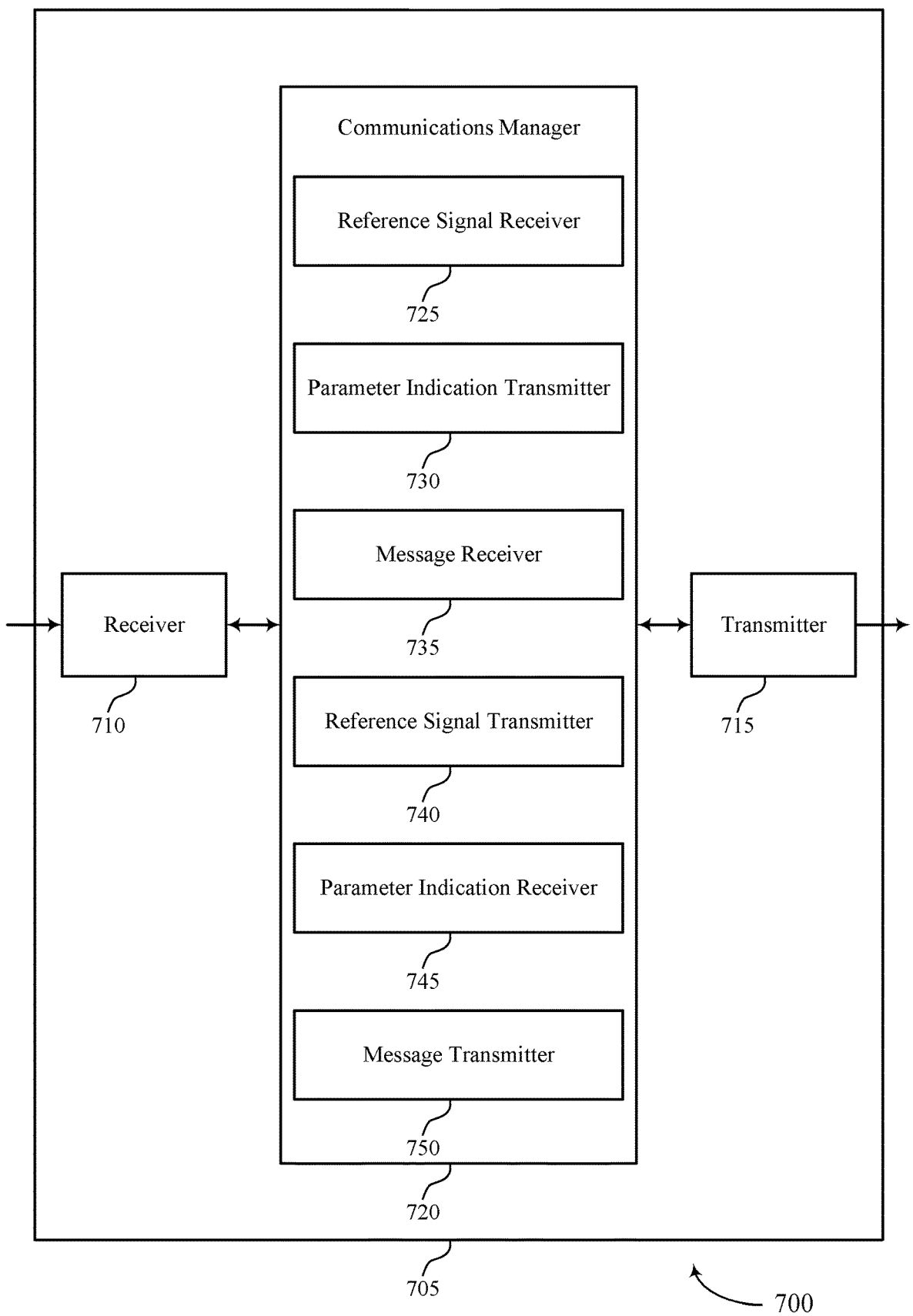

FIG. 7 shows a block diagram 700 of a device 705 that supports spatial precoding for ISI reduction in single carrier in accordance with aspects of the present disclosure. The device 705 may be an example of aspects of a device 605 or a wireless device 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to spatial precoding for ISI reduction in single carrier). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to spatial precoding for ISI reduction in single carrier). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of spatial precoding for ISI reduction in single carrier as described herein. For example, the communications manager 720 may include a reference signal receiver 725, a parameter indication transmitter 730, a message receiver 735, a reference signal transmitter 740, a parameter indication receiver 745, a message transmitter 750, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first wireless device in accordance with examples as disclosed herein. The reference signal receiver 725 may be configured as or otherwise support a means for receiving, from a second wireless device and via a set of receive beams at the first wireless device, a set of reference signals associated with a set of transmit beams at the second wireless device. The parameter indication transmitter 730 may be configured as or otherwise support a means for transmitting, to the second wireless device, a set of parameters indicating a set of complex gain values and a set of delay parameters associated with the set of receive beams and the set of transmit beams. The message receiver 735 may be configured as or otherwise support a means for receiving, from the second wireless device, a message via a coherent receive beam at the first wireless device, the coherent receive beam based on the set complex gain values and the set of delay parameters associated with the set of receive beams and the set of transmit beams.

Additionally or alternatively, the communications manager 720 may support wireless communications in accordance with examples as disclosed herein. The reference signal transmitter 740 may be configured as or otherwise support a means for transmitting, to a first wireless device, a set of reference signals via a set of transmit beams at the second wireless device. The parameter indication receiver 745 may be configured as or otherwise support a means for receiving, from the first wireless device, a set of parameters indicating a set of complex gain values and a set of delay parameters associated with a set of receive beams and the set of transmit beams at the first wireless device based on the set of reference signals. The message transmitter 750 may be configured as or otherwise support a means for transmitting, to the first wireless device, a message via a combined transmit beam corresponding to a set of beam weights associated with a coherent receive beam for the first wireless device based on the set of complex gain values and the set of delay parameters.

Figure 8:
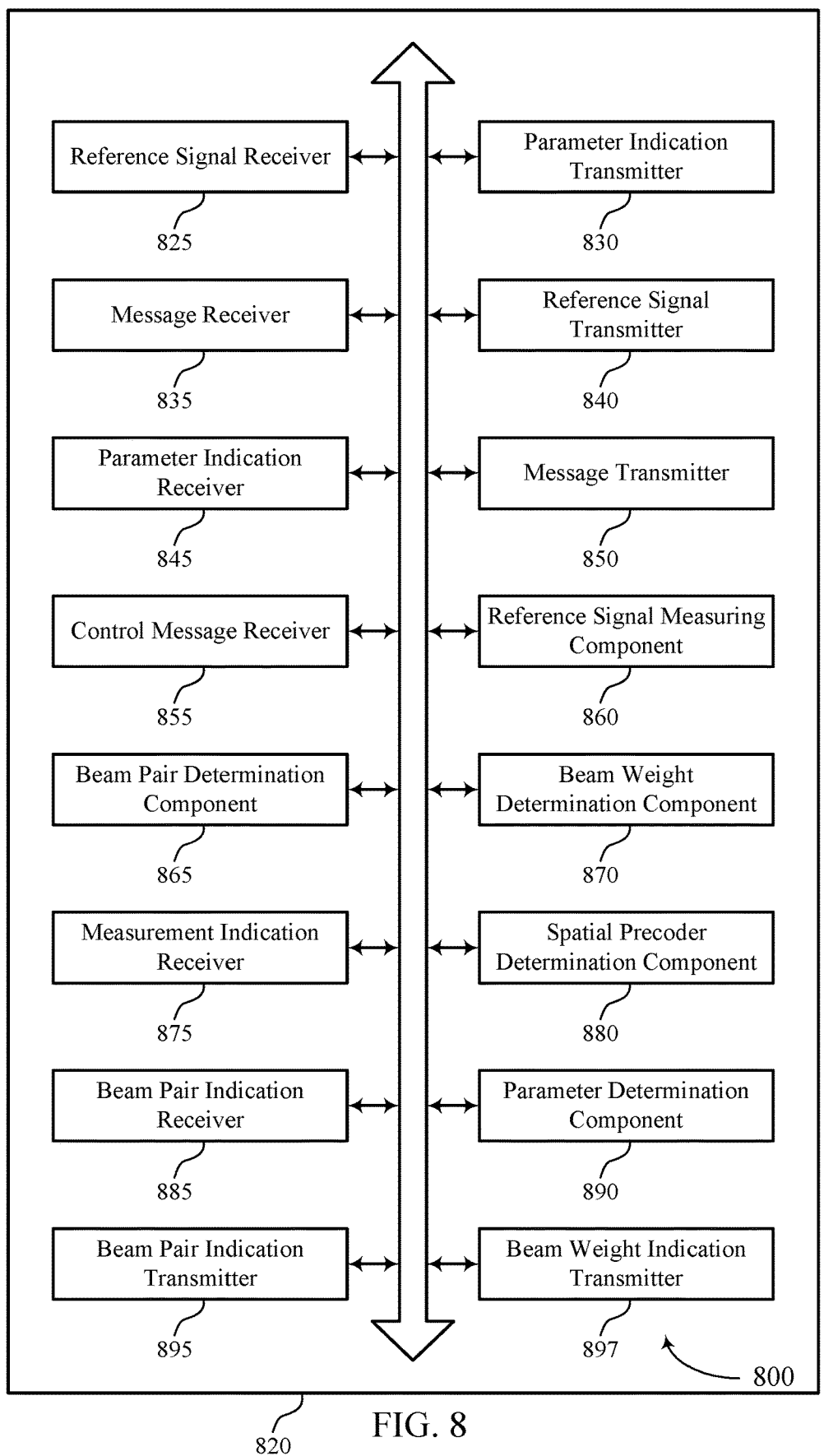
FIG. 8 shows a block diagram of a communications manager that supports spatial precoding for ISI reduction in single carrier in accordance with aspects of the present disclosure.

FIG. 8 shows a block diagram 800 of a communications manager 820 that supports spatial precoding for ISI reduction in single carrier in accordance with aspects of the present disclosure. The communications manager 820 may be an example of aspects of a communications manager 620, a communications manager 720, or both, as described herein. The communications manager 820, or various components thereof, may be an example of means for performing various aspects of spatial precoding for ISI reduction in single carrier as described herein. For example, the communications manager 820 may include a reference signal receiver 825, a parameter indication transmitter 830, a message receiver 835, a reference signal transmitter 840, a parameter indication receiver 845, a message transmitter 850, a control message receiver 855, a reference signal measuring component 860, a beam pair determination component 865, a beam weight determination component 870, a measurement indication receiver 875, a spatial precoder determination component 880, a beam pair indication receiver 885, a parameter determination component 890, a beam pair indication transmitter 895, a beam weight indication transmitter 897, or any combination thereof. Each of these components may communicate, directly or indirectly, with one another (e.g., via one or more buses).

The communications manager 820 may support wireless communications at a first wireless device in accordance with examples as disclosed herein. The reference signal receiver 825 may be configured as or otherwise support a means for receiving, from a second wireless device and via a set of receive beams at the first wireless device, a set of reference signals associated with a set of transmit beams at the second wireless device. The parameter indication transmitter 830 may be configured as or otherwise support a means for transmitting, to the second wireless device, a set of parameters indicating a set of complex gain values and a set of delay parameters associated with the set of receive beams and the set of transmit beams. The message receiver 835 may be configured as or otherwise support a means for receiving, from the second wireless device, a message via a coherent receive beam at the first wireless device, the coherent receive beam based on the set complex gain values and the set of delay parameters associated with the set of receive beams and the set of transmit beams.

In some examples, the control message receiver 855 may be configured as or otherwise support a means for receiving, from the second wireless device, a control message indicating indices corresponding to a set of beam weights associated with the coherent receive beam for the first wireless device based on the set of parameters, where the message is received based on the set of beam weights.

In some examples, the control message receiver 855 may be configured as or otherwise support a means for receiving, from the second wireless device, a control message indicating a spatial precoding, the spatial precoding being applied based on the set of parameters, where the control message is received based on the set of beam weights.

In some examples, the reference signal measuring component 860 may be configured as or otherwise support a means for measuring the set of reference signals received via the set of receive beams based on a first tap in a time domain. In some examples, the beam pair determination component 865 may be configured as or otherwise support a means for determining one or more beam pairs associated with the set of receive beams and the set of transmit beams based on a respective measurement for each beam pair of a set of beam pairs associated with the set of receive beams and the set of transmit beams.

In some examples, the parameter determination component 890 may be configured as or otherwise support a means for determining the set of complex gain values and the set of delay parameters for the one or more beam pairs. In some examples, the beam pair indication transmitter 895 may be configured as or otherwise support a means for transmitting an indication of the one or more beam pairs to the second wireless device, the one or more beam pairs based on an energy of a strongest tap of the time domain, a ratio between the energy of the strongest tap of the time domain and a summation of energies of other taps, a signal to interference noise ratio, or some combination thereof.

In some examples, the reference signal measuring component 860 may be configured as or otherwise support a means for measuring the set of reference signals received via the set of receive beams based on one or more second taps in the time domain, the one or more second taps associated with ISI at the first wireless device. In some examples, the parameter determination component 890 may be configured as or otherwise support a means for determining a second set of complex gain values and a second set of delay parameters associated with the one or more second taps. In some examples, the parameter indication transmitter 830 may be configured as or otherwise support a means for transmitting, to the second wireless device, the second set of complex gain values and the second set of delay parameters associated with the one or more second taps.

In some examples, the coherent receive beam is associated with a set of beam weights based on the second set of complex gain values and the second set of delay parameters.

In some examples, the reference signal receiver 825 may be configured as or otherwise support a means for receiving, from a third wireless device and via the set of receive beams of the first wireless device, a second set of reference signals associated with a third set of beams of the third wireless device. In some examples, the parameter indication transmitter 830 may be configured as or otherwise support a means for transmitting, to the third wireless device, a second set of parameters indicating a second set of complex gain values and a second set of delay parameters associated with the set of receive beams. In some examples, the control message receiver 855 may be configured as or otherwise support a means for receiving, from the third wireless device, a second control message indicating indices corresponding to a second set of beam weights associated with the coherent receive beam based on the second set of parameters. In some examples, the message receiver 835 may be configured as or otherwise support a means for receiving, from the third wireless device, at least a portion of the message via the coherent receive beam based on the second control message.

In some examples, the reference signal receiver 825 may be configured as or otherwise support a means for receiving, from a third wireless device and via the set of receive beams of the first wireless device, a second set of reference signals associated with a third set of beams of the third wireless device. In some examples, the parameter indication transmitter 830 may be configured as or otherwise support a means for transmitting, to the third wireless device, a second set of parameters indicating a second set of complex gain values and a second set of delay parameters associated with the set of receive beams and the third set of beams. In some examples, the control message receiver 855 may be configured as or otherwise support a means for receiving, from the third wireless device, a second control message indicating a second spatial precoding, the second spatial precoding being applied based on the second set of parameters, where the second control message is received based on the set of beam weights. In some examples, the message receiver 835 may be configured as or otherwise support a means for receiving, from the third wireless device, at least a portion of the message via the coherent receive beam based on the second control message.

Additionally or alternatively, the communications manager 820 may support wireless communications in accordance with examples as disclosed herein. The reference signal transmitter 840 may be configured as or otherwise support a means for transmitting, to a first wireless device, a set of reference signals via a set of transmit beams at the second wireless device. The parameter indication receiver 845 may be configured as or otherwise support a means for receiving, from the first wireless device, a set of parameters indicating a set of complex gain values and a set of delay parameters associated with a set of receive beams and the set of transmit beams at the first wireless device based on the set of reference signals. The message transmitter 850 may be configured as or otherwise support a means for transmitting, to the first wireless device, a message via a combined transmit beam corresponding to a set of beam weights associated with a coherent receive beam for the first wireless device based on the set of complex gain values and the set of delay parameters.

In some examples, the beam weight determination component 870 may be configured as or otherwise support a means for determining the set of beam weights associated with the coherent receive beam for the first wireless device based on the set of transmit beams and the set of parameters.

In some examples, the beam weight indication transmitter 897 may be configured as or otherwise support a means for transmitting, to the first wireless device, a control message indicating the set of beam weights associated with the coherent receive beam for the first wireless device.

In some examples, the measurement indication receiver 875 may be configured as or otherwise support a means for receiving, from the first wireless device, an indication of one or more signal to interference and noise ratios associated with the set of complex gain values and the set of delay parameters associated with one or more beam pairs. In some examples, the spatial precoder determination component 880 may be configured as or otherwise support a means for determining a spatial precoder based at least in part the indication of the one or more signal to interference and noise ratios associated with the set of complex gain values and the set of delay parameters associated with the one or more beam pairs.

In some examples, to support transmitting the message, the message transmitter 850 may be configured as or otherwise support a means for transmitting the message in accordance with the spatial precoder.

In some examples, the beam pair indication receiver 885 may be configured as or otherwise support a means for receiving, from the first wireless device, an indication of one or more beam pairs associated with the set of receive beams, the combined transmit beam, and the set of transmit beams, the indication of the one or more beam pairs based on a respective measurement for each beam pair of a set of beam pairs and a first tap in a time domain.

In some examples, the parameter indication receiver 845 may be configured as or otherwise support a means for receiving, from the first wireless device, a second set of complex gain values and a second set of delay parameters associated with one or more second taps, where the second set of complex gain values and the second set of delay parameters are based on measurements associated with the set of reference signals via one or more second taps in the time domain, the one or more second taps associated with ISI at the first wireless device.

In some examples, the beam weight determination component 870 may be configured as or otherwise support a means for determining the set of beam weights associated with the coherent receive beam for the first wireless device based on the second set of complex gain values and the second set of delay parameters.

Figure 9:
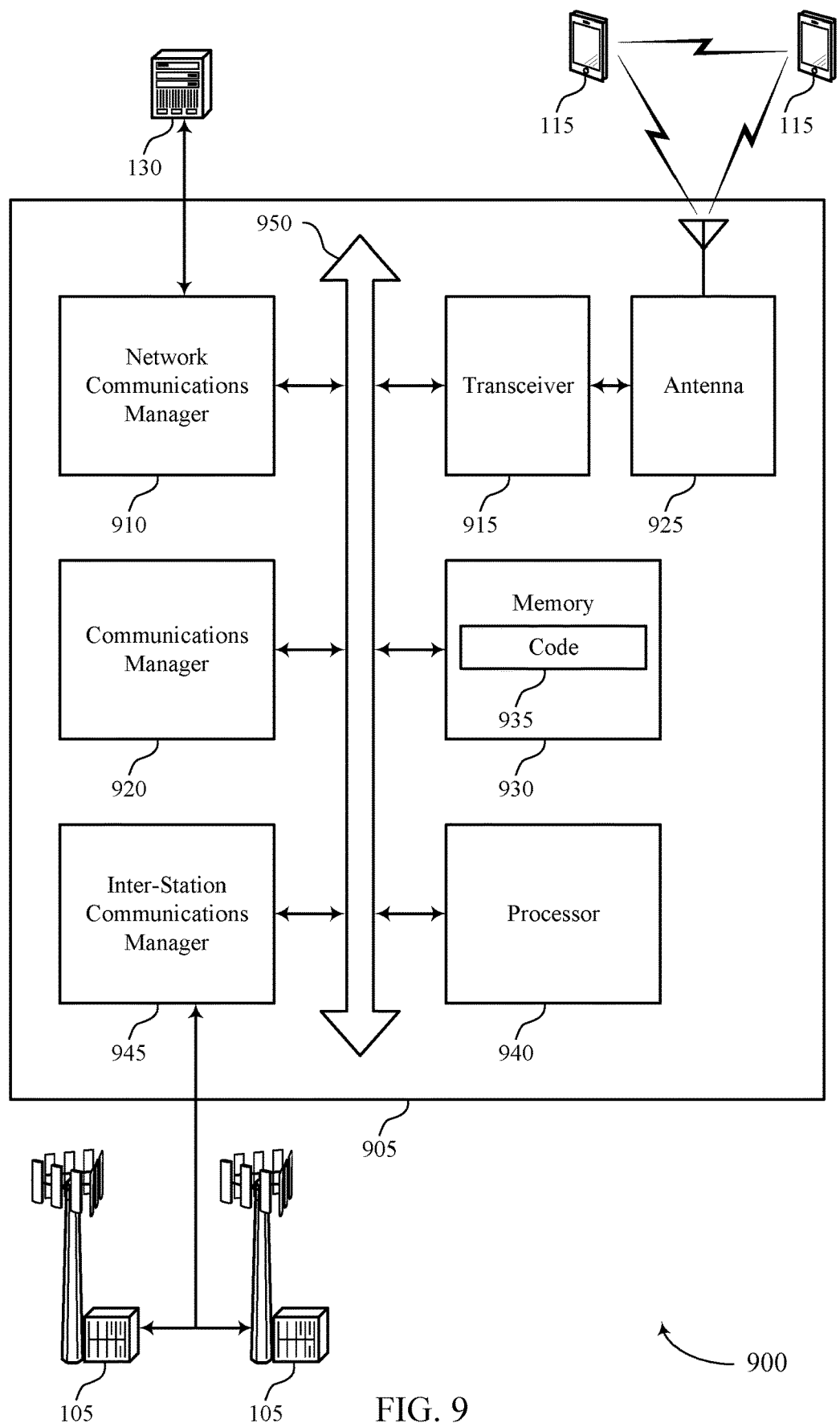
FIG. 9 shows a diagram of a system including a device that supports spatial precoding for ISI reduction in single carrier in accordance with aspects of the present disclosure.

FIG. 9 shows a diagram of a system 900 including a device 905 that supports spatial precoding for ISI reduction in single carrier in accordance with aspects of the present disclosure. The device 905 may be an example of or include the components of a device 605, a device 705, or a wireless device as described herein. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting spatial precoding for ISI reduction in single carrier). For example, the device 905 or a component of the device 905 may include a processor 940 and memory 930 coupled to the processor 940, the processor 940 and memory 930 configured to perform various functions described herein.

The inter-station communications manager 945 may manage communications with other network entities 105, and may include a controller or scheduler for controlling communications with UEs 115 in cooperation with other network entities 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between network entities 105.

The communications manager 920 may support wireless communications at a first wireless device in accordance with examples as disclosed herein. For example, the communications manager 920 may be configured as or otherwise support a means for receiving, from a second wireless device and via a set of receive beams at the first wireless device, a set of reference signals associated with a set of transmit beams at the second wireless device. The communications manager 920 may be configured as or otherwise support a means for transmitting, to the second wireless device, a set of parameters indicating a set of complex gain values and a set of delay parameters associated with the set of receive beams and the set of transmit beams. The communications manager 920 may be configured as or otherwise support a means for receiving, from the second wireless device, a message via a coherent receive beam at the first wireless device, the coherent receive beam based on the set complex gain values and the set of delay parameters associated with the set of receive beams and the set of transmit beams.

Additionally or alternatively, the communications manager 920 may support wireless communications in accordance with examples as disclosed herein. For example, the communications manager 920 may be configured as or otherwise support a means for transmitting, to a first wireless device, a set of reference signals via a set of transmit beams at the second wireless device. The communications manager 920 may be configured as or otherwise support a means for receiving, from the first wireless device, a set of parameters indicating a set of complex gain values and a set of delay parameters associated with a set of receive beams and the set of transmit beams at the first wireless device based on the set of reference signals. The communications manager 920 may be configured as or otherwise support a means for transmitting, to the first wireless device, a message via a combined transmit beam corresponding to a set of beam weights associated with a coherent receive beam for the first wireless device based on the set of complex gain values and the set of delay parameters.

By including or configuring the communications manager 920 in accordance with examples as described herein, the device 905 may support techniques for communication reliability, reduced power consumption, more efficient utilization of communication resources, improved coordination between devices, and longer battery life by increasing spatial diversity of transmit and receive beams via coherent combining of transmit and receive beams.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of spatial precoding for ISI reduction in single carrier as described herein, or the processor 940 and the memory 930 may be otherwise configured to perform or support such operations.

Figure 10:
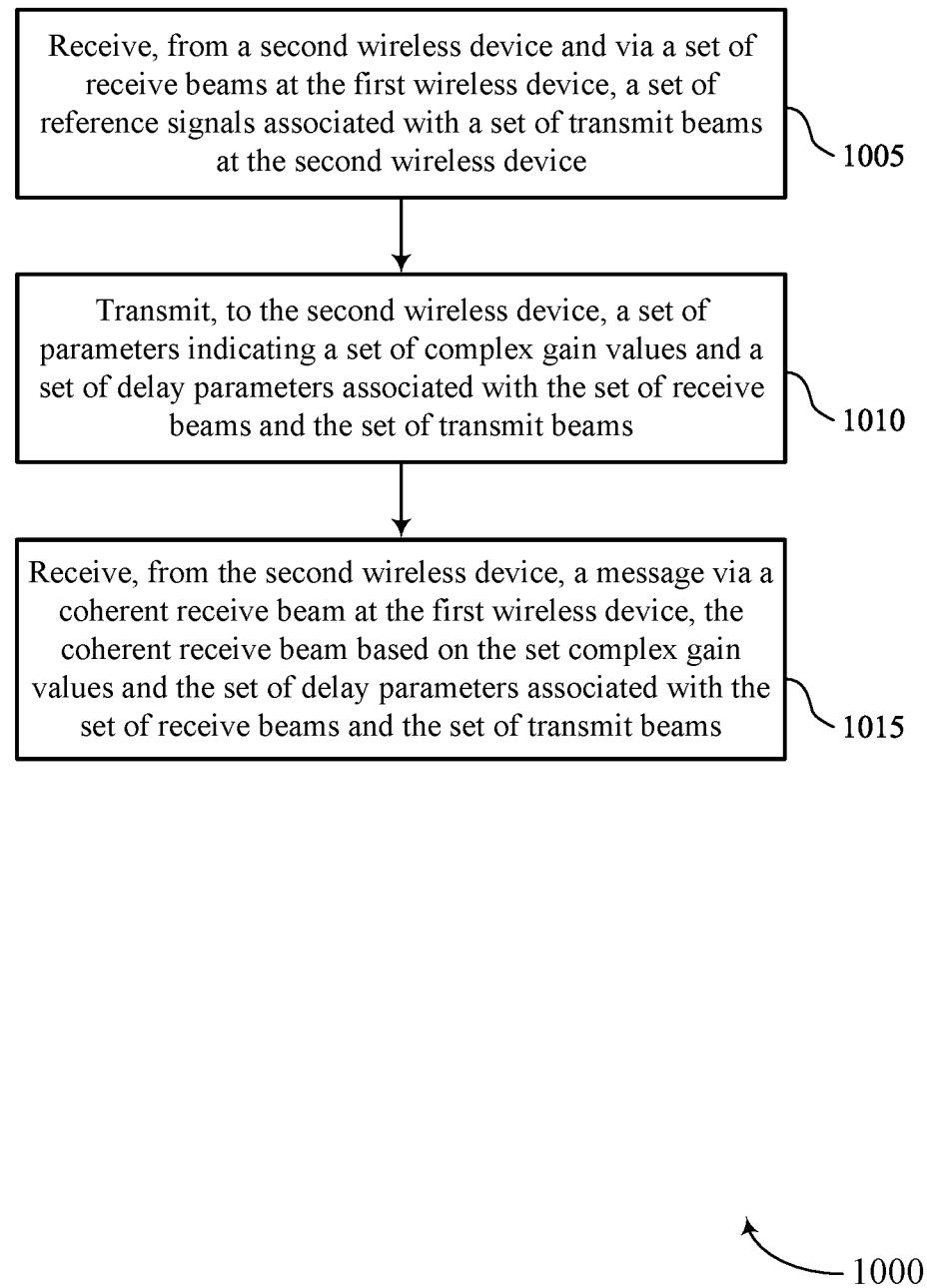
FIGS. 10 through 13 show flowcharts illustrating methods that support spatial precoding for ISI reduction in single carrier in accordance with aspects of the present disclosure.

FIG. 10 shows a flowchart illustrating a method 1000 that supports spatial precoding for ISI reduction in single carrier in accordance with aspects of the present disclosure. The operations of the method 1000 may be implemented by a wireless device or its components as described herein. For example, the operations of the method 1000 may be performed by a wireless device as described with reference to FIGS. 1 through 9. In some examples, a wireless device may execute a set of instructions to control the functional elements of the wireless device to perform the described functions. Additionally or alternatively, the wireless device may perform aspects of the described functions using special-purpose hardware.

At 1005, the method may include receiving, from a second wireless device and via a set of receive beams at the first wireless device, a set of reference signals associated with a set of transmit beams at the second wireless device. The operations of 1005 may be performed in accordance with examples as disclosed herein. In some examples, aspects of the operations of 1005 may be performed by a reference signal receiver 825 as described with reference to FIG. 8.

At 1010, the method may include transmitting, to the second wireless device, a set of parameters indicating a set of complex gain values and a set of delay parameters associated with the set of receive beams and the set of transmit beams. The operations of 1010 may be performed in accordance with examples as disclosed herein. In some examples, aspects of the operations of 1010 may be performed by a parameter indication transmitter 830 as described with reference to FIG. 8.

At 1015, the method may include receiving, from the second wireless device, a message via a coherent receive beam at the first wireless device, the coherent receive beam based on the set complex gain values and the set of delay parameters associated with the set of receive beams and the set of transmit beams. The operations of 1015 may be performed in accordance with examples as disclosed herein. In some examples, aspects of the operations of 1015 may be performed by a message receiver 835 as described with reference to FIG. 8.

Figure 11:
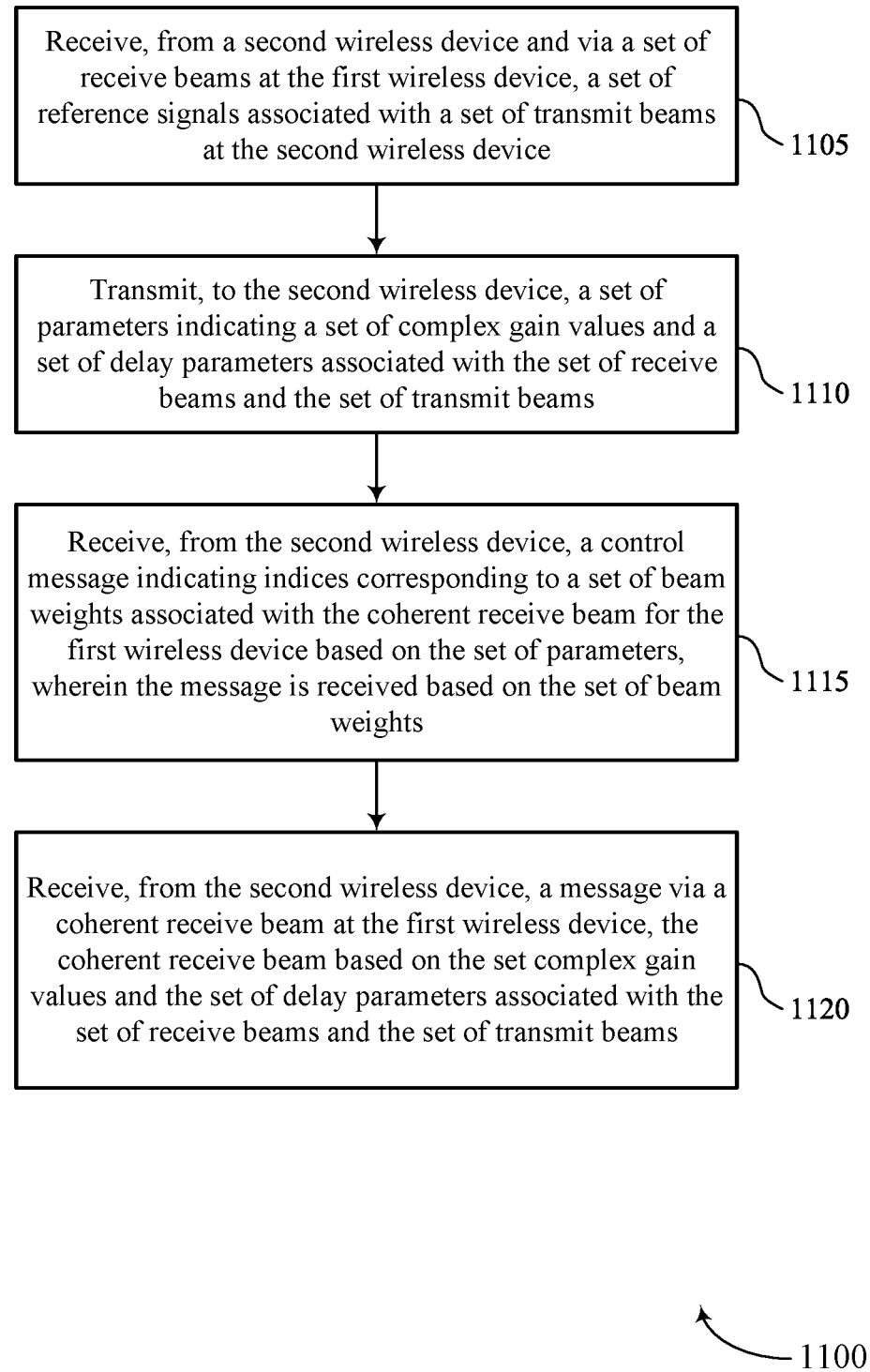

FIG. 11 shows a flowchart illustrating a method 1100 that supports spatial precoding for ISI reduction in single carrier in accordance with aspects of the present disclosure. The operations of the method 1100 may be implemented by a wireless device or its components as described herein. For example, the operations of the method 1100 may be performed by a wireless device as described with reference to FIGS. 1 through 9. In some examples, a wireless device may execute a set of instructions to control the functional elements of the wireless device to perform the described functions. Additionally or alternatively, the wireless device may perform aspects of the described functions using special-purpose hardware.

At 1105, the method may include receiving, from a second wireless device and via a set of receive beams at the first wireless device, a set of reference signals associated with a set of transmit beams at the second wireless device. The operations of 1105 may be performed in accordance with examples as disclosed herein. In some examples, aspects of the operations of 1105 may be performed by a reference signal receiver 825 as described with reference to FIG. 8.

At 1110, the method may include transmitting, to the second wireless device, a set of parameters indicating a set of complex gain values and a set of delay parameters associated with the set of receive beams and the set of transmit beams. The operations of 1110 may be performed in accordance with examples as disclosed herein. In some examples, aspects of the operations of 1110 may be performed by a parameter indication transmitter 830 as described with reference to FIG. 8.

At 1115, the method may include receiving, from the second wireless device, a control message indicating indices corresponding to a set of beam weights associated with the coherent receive beam for the first wireless device based on the set of parameters, where the message is received based on the set of beam weights. The operations of 1115 may be performed in accordance with examples as disclosed herein. In some examples, aspects of the operations of 1115 may be performed by a control message receiver 855 as described with reference to FIG. 8.

At 1120, the method may include receiving, from the second wireless device, a message via a coherent receive beam at the first wireless device, the coherent receive beam based on the set complex gain values and the set of delay parameters associated with the set of receive beams and the set of transmit beams. The operations of 1120 may be performed in accordance with examples as disclosed herein. In some examples, aspects of the operations of 1120 may be performed by a message receiver 835 as described with reference to FIG. 8.

Figure 12:
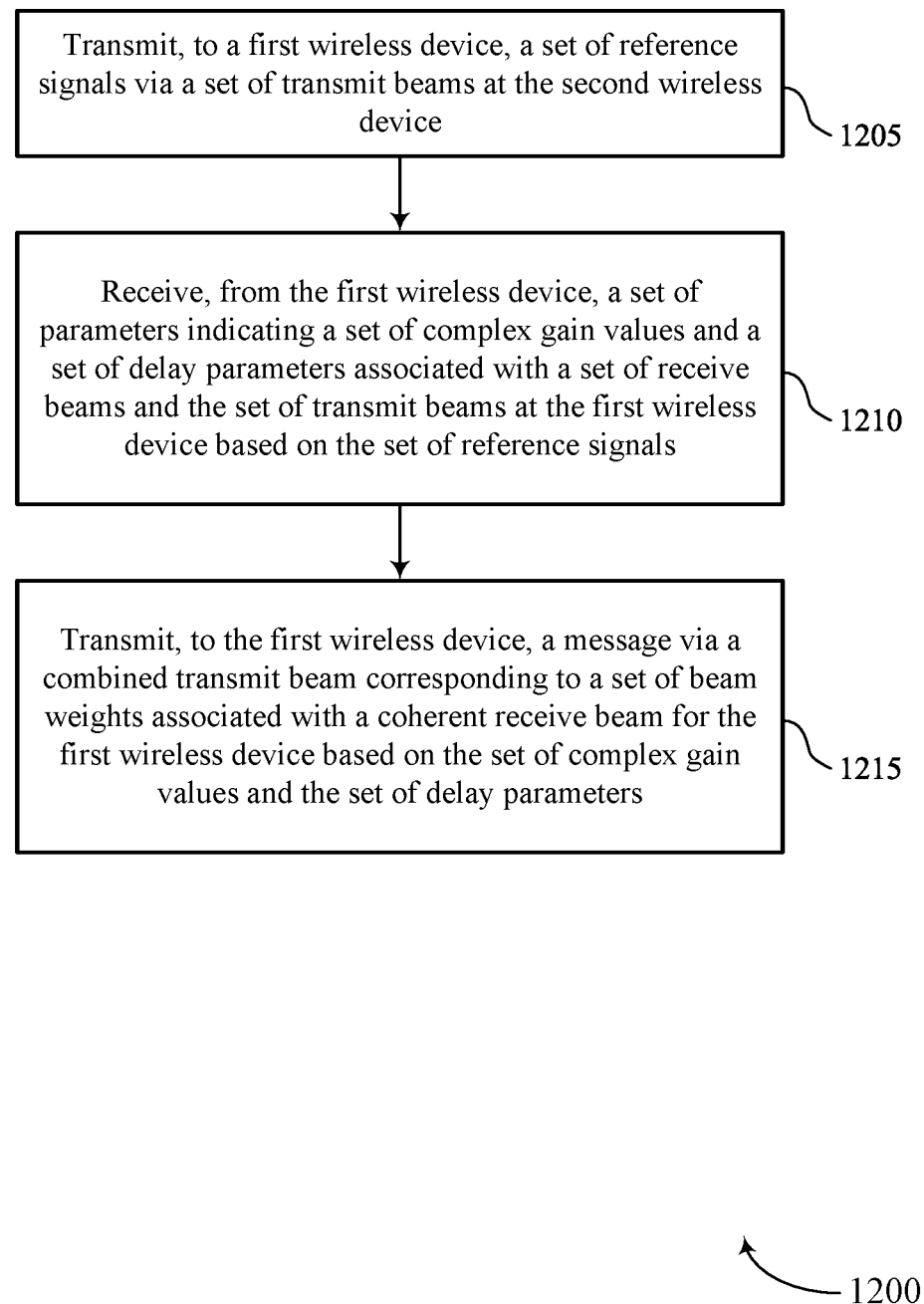

FIG. 12 shows a flowchart illustrating a method 1200 that supports spatial precoding for ISI reduction in single carrier in accordance with aspects of the present disclosure. The operations of the method 1200 may be implemented by a wireless device or its components as described herein. For example, the operations of the method 1200 may be performed by a wireless device as described with reference to FIGS. 1 through 9. In some examples, a wireless device may execute a set of instructions to control the functional elements of the wireless device to perform the described functions. Additionally or alternatively, the wireless device may perform aspects of the described functions using special-purpose hardware.

At 1205, the method may include transmitting, to a first wireless device, a set of reference signals via a set of transmit beams at the second wireless device. The operations of 1205 may be performed in accordance with examples as disclosed herein. In some examples, aspects of the operations of 1205 may be performed by a reference signal transmitter 840 as described with reference to FIG. 8.

At 1210, the method may include receiving, from the first wireless device, a set of parameters indicating a set of complex gain values and a set of delay parameters associated with a set of receive beams and the set of transmit beams at the first wireless device based on the set of reference signals. The operations of 1210 may be performed in accordance with examples as disclosed herein. In some examples, aspects of the operations of 1210 may be performed by a parameter indication receiver 845 as described with reference to FIG. 8.

At 1215, the method may include transmitting, to the first wireless device, a message via a combined transmit beam corresponding to a set of beam weights associated with a coherent receive beam for the first wireless device based on the set of complex gain values and the set of delay parameters. The operations of 1215 may be performed in accordance with examples as disclosed herein. In some examples, aspects of the operations of 1215 may be performed by a message transmitter 850 as described with reference to FIG. 8.

Figure 13:
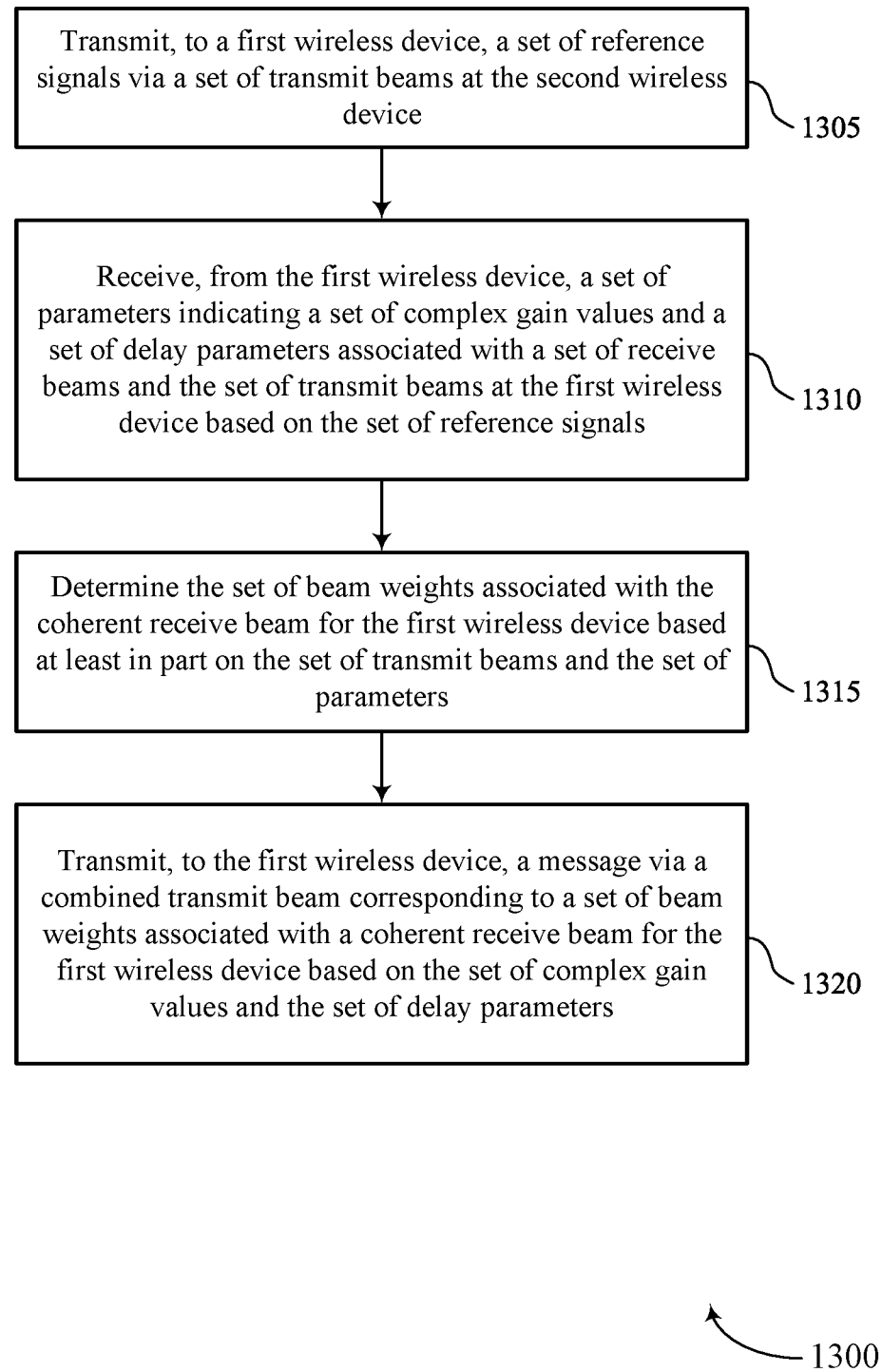

FIG. 13 shows a flowchart illustrating a method 1300 that supports spatial precoding for ISI reduction in single carrier in accordance with aspects of the present disclosure. The operations of the method 1300 may be implemented by a wireless device or its components as described herein. For example, the operations of the method 1300 may be performed by a wireless device as described with reference to FIGS. 1 through 9. In some examples, a wireless device may execute a set of instructions to control the functional elements of the wireless device to perform the described functions. Additionally or alternatively, the wireless device may perform aspects of the described functions using special-purpose hardware.

At 1305, the method may include transmitting, to a first wireless device, a set of reference signals via a set of transmit beams at the second wireless device. The operations of 1305 may be performed in accordance with examples as disclosed herein. In some examples, aspects of the operations of 1305 may be performed by a reference signal transmitter 840 as described with reference to FIG. 8.

At 1310, the method may include receiving, from the first wireless device, a set of parameters indicating a set of complex gain values and a set of delay parameters associated with a set of receive beams and the set of transmit beams at the first wireless device based on the set of reference signals. The operations of 1310 may be performed in accordance with examples as disclosed herein. In some examples, aspects of the operations of 1310 may be performed by a parameter indication receiver 845 as described with reference to FIG. 8.

At 1315, the method may include determining the set of beam weights associated with the coherent receive beam for the first wireless device based on the set of transmit beams and the set of parameters. The operations of 1315 may be performed in accordance with examples as disclosed herein. In some examples, aspects of the operations of 1315 may be performed by a beam weight determination component 870 as described with reference to FIG. 8.

At 1320, the method may include transmitting, to the first wireless device, a message via a combined transmit beam corresponding to a set of beam weights associated with a coherent receive beam for the first wireless device based on the set of complex gain values and the set of delay parameters. The operations of 1320 may be performed in accordance with examples as disclosed herein. In some examples, aspects of the operations of 1320 may be performed by a message transmitter 850 as described with reference to FIG. 8.

The following provides an overview of aspects of the present disclosure:

Aspect 1: A method for wireless communications at a first wireless device, comprising: receiving, from a second wireless device and via a set of receive beams at the first wireless device, a set of reference signals associated with a set of transmit beams at the second wireless device; transmitting, to the second wireless device, a set of parameters indicating a set of complex gain values and a set of delay parameters associated with the set of receive beams and the set of transmit beams; and receiving, from the second wireless device, a message via a coherent receive beam at the first wireless device, the coherent receive beam based at least in part on the set complex gain values and the set of delay parameters associated with the set of receive beams and the set of transmit beams.

Aspect 2: The method of aspect 1, further comprising: receiving, from the second wireless device, a control message indicating indices corresponding to a set of beam weights associated with the coherent receive beam for the first wireless device based at least in part on the set of parameters, wherein the message is received based at least in part on the set of beam weights.

Aspect 3: The method of any of aspects 1 through 2, further comprising: receiving, from the second wireless device, a control message indicating a spatial precoding, the spatial precoding being applied based at least in part on the set of parameters, wherein the control message is received based at least in part on the set of beam weights.

Aspect 4: The method of any of aspects 1 through 3, further comprising: measuring the set of reference signals received via the set of receive beams based at least in part on a first tap in a time domain; and determining one or more beam pairs associated with the set of receive beams and the set of transmit beams based at least in part on a respective measurement for each beam pair of a set of beam pairs associated with the set of receive beams and the set of transmit beams.

Aspect 5: The method of aspect 4, further comprising: determining the set of complex gain values and the set of delay parameters for the one or more beam pairs; and transmitting an indication of the one or more beam pairs to the second wireless device, the one or more beam pairs based at least in part on an energy of a strongest tap of the time domain, a ratio between the energy of the strongest tap of the time domain and a summation of energies of other taps, a signal to interference noise ratio, or some combination thereof.

Aspect 6: The method of any of aspects 4 through 5, further comprising: measuring the set of reference signals received via the set of receive beams based at least in part on one or more second taps in the time domain, the one or more second taps associated with inter symbol interference at the first wireless device; determining a second set of complex gain values and a second set of delay parameters associated with the one or more second taps; and transmitting, to the second wireless device, the second set of complex gain values and the second set of delay parameters associated with the one or more second taps.

Aspect 7: The method of aspect 6, wherein the coherent receive beam is associated with a set of beam weights based at least in part on the second set of complex gain values and the second set of delay parameters.

Aspect 8: The method of any of aspects 1 through 7, further comprising: receiving, from a third wireless device and via the set of receive beams of the first wireless device, a second set of reference signals associated with a third set of beams of the third wireless device; transmitting, to the third wireless device, a second set of parameters indicating a second set of complex gain values and a second set of delay parameters associated with the set of receive beams; receiving, from the third wireless device, a second control message indicating indices corresponding to a second set of beam weights associated with the coherent receive beam based at least in part on the second set of parameters; and receiving, from the third wireless device, at least a portion of the message via the coherent receive beam based at least in part on the second control message.

Aspect 9: The method of any of aspects 1 through 8, further comprising: receiving, from a third wireless device and via the set of receive beams of the first wireless device, a second set of reference signals associated with a third set of beams of the third wireless device; transmitting, to the third wireless device, a second set of parameters indicating a second set of complex gain values and a second set of delay parameters associated with the set of receive beams and the third set of beams; receiving, from the third wireless device, a second control message indicating a second spatial precoding, the second spatial precoding being applied based at least in part on the second set of parameters, wherein the second control message is received based at least in part on the set of beam weights; and receiving, from the third wireless device, at least a portion of the message via the coherent receive beam based at least in part on the second control message.

Aspect 10: A method for wireless communications, at a second wireless device comprising: transmitting, to a first wireless device, a set of reference signals via a set of transmit beams at the second wireless device; receiving, from the first wireless device, a set of parameters indicating a set of complex gain values and a set of delay parameters associated with a set of receive beams and the set of transmit beams at the first wireless device based at least in part on the set of reference signals; and transmitting, to the first wireless device, a message via a combined transmit beam corresponding to a set of beam weights associated with a coherent receive beam for the first wireless device based at least in part on the set of complex gain values and the set of delay parameters.

Aspect 11: The method of aspect 10, further comprising: determining the set of beam weights associated with the coherent receive beam for the first wireless device based at least in part on the set of transmit beams and the set of parameters.

Aspect 12: The method of aspect 11, further comprising: transmitting, to the first wireless device, a control message indicating the set of beam weights associated with the coherent receive beam for the first wireless device.

Aspect 13: The method of any of aspects 10 through 12, further comprising: receiving, from the first wireless device, an indication of one or more signal to interference and noise ratios associated with the set of complex gain values and the set of delay parameters associated with one or more beam pairs; and determining a spatial precoder based at least in part the indication of the one or more signal to interference and noise ratios associated with the set of complex gain values and the set of delay parameters associated with the one or more beam pairs.

Aspect 14: The method of aspect 13, wherein transmitting the message comprises: transmitting the message in accordance with the spatial precoder.

Aspect 15: The method of any of aspects 10 through 14, further comprising: receiving, from the first wireless device, an indication of one or more beam pairs associated with the set of receive beams, the combined transmit beam, and the set of transmit beams, the indication of the one or more beam pairs based at least in part on a respective measurement for each beam pair of a set of beam pairs and a first tap in a time domain.

Aspect 16: The method of aspect 15, further comprising: receiving, from the first wireless device, a second set of complex gain values and a second set of delay parameters associated with one or more second taps, wherein the second set of complex gain values and the second set of delay parameters are based on measurements associated with the set of reference signals via one or more second taps in the time domain, the one or more second taps associated with inter symbol interference at the first wireless device.

Aspect 17: The method of aspect 16, further comprising: determining the set of beam weights associated with the coherent receive beam for the first wireless device based at least in part on the second set of complex gain values and the second set of delay parameters.

Aspect 18: An apparatus for wireless communications at a first wireless device, comprising a processor; memory coupled with the processor; and instructions stored in the memory and executable by the processor to cause the apparatus to perform a method of any of aspects 1 through 9.

Aspect 19: An apparatus for wireless communications at a first wireless device, comprising at least one means for performing a method of any of aspects 1 through 9.

Aspect 20: A non-transitory computer-readable medium storing code for wireless communications at a first wireless device, the code comprising instructions executable by a processor to perform a method of any of aspects 1 through 9.

Aspect 21: An apparatus for wireless communications, comprising a processor; memory coupled with the processor; and instructions stored in the memory and executable by the processor to cause the apparatus to perform a method of any of aspects 10 through 17.

Aspect 22: An apparatus for wireless communications, comprising at least one means for performing a method of any of aspects 10 through 17.

Aspect 23: A non-transitory computer-readable medium storing code for wireless communications, the code comprising instructions executable by a processor to perform a method of any of aspects 10 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
   receiving, from a second wireless device and via a set of receive beams at the first wireless device, a set of reference signals associated with a set of transmit beams at the second wireless device;
   transmitting, to the second wireless device, a set of parameters indicating a set of complex gain values and a set of delay parameters associated with the set of receive beams and the set of transmit beams; and
   receiving, from the second wireless device, a message via a coherent receive beam at the first wireless device, the coherent receive beam based at least in part on the set complex gain values and the set of delay parameters associated with the set of receive beams and the set of transmit beams.

2. The method of claim 1, further comprising:
   receiving, from the second wireless device, a control message indicating indices corresponding to a set of beam weights associated with the coherent receive beam for the first wireless device based at least in part on the set of parameters, wherein the message is received based at least in part on the set of beam weights.

3. The method of claim 1, further comprising:
   receiving, from the second wireless device, a control message indicating a spatial precoding, the spatial precoding being applied based at least in part on the set of parameters, wherein the control message is received based at least in part on a set of beam weights.

4. The method of claim 1, further comprising:
   measuring the set of reference signals received via the set of receive beams based at least in part on a first tap in a time domain; and
   determining one or more beam pairs associated with the set of receive beams and the set of transmit beams based at least in part on a respective measurement for each beam pair of a set of beam pairs associated with the set of receive beams and the set of transmit beams.

5. The method of claim 4, further comprising:
   determining the set of complex gain values and the set of delay parameters for the one or more beam pairs; and
   transmitting an indication of the one or more beam pairs to the second wireless device, the one or more beam pairs based at least in part on an energy of a strongest tap of the time domain, a ratio between the energy of the strongest tap of the time domain and a summation of energies of other taps, a signal to interference noise ratio, or some combination thereof.

6. The method of claim 4, further comprising:
   measuring the set of reference signals received via the set of receive beams based at least in part on one or more second taps in the time domain, the one or more second taps associated with inter symbol interference at the first wireless device;
   determining a second set of complex gain values and a second set of delay parameters associated with the one or more second taps; and
   transmitting, to the second wireless device, the second set of complex gain values and the second set of delay parameters associated with the one or more second taps.

7. The method of claim 6, wherein the coherent receive beam is associated with a set of beam weights based at least in part on the second set of complex gain values and the second set of delay parameters.

8. The method of claim 1, further comprising:
   receiving, from a third wireless device and via the set of receive beams of the first wireless device, a second set of reference signals associated with a third set of beams of the third wireless device;
   transmitting, to the third wireless device, a second set of parameters indicating a second set of complex gain values and a second set of delay parameters associated with the set of receive beams;

receiving, from the third wireless device, a second control message indicating indices corresponding to a second set of beam weights associated with the coherent receive beam based at least in part on the second set of parameters; and
receiving, from the third wireless device, at least a portion of the message via the coherent receive beam based at least in part on the second control message.

9. The method of claim 1, further comprising:
receiving, from a third wireless device and via the set of receive beams of the first wireless device, a second set of reference signals associated with a third set of beams of the third wireless device;
transmitting, to the third wireless device, a second set of parameters indicating a second set of complex gain values and a second set of delay parameters associated with the set of receive beams and the third set of beams;
receiving, from the third wireless device, a second control message indicating a second spatial precoding, the second spatial precoding being applied based at least in part on the second set of parameters, wherein the second control message is received based at least in part on a set of beam weights; and
receiving, from the third wireless device, at least a portion of the message via the coherent receive beam based at least in part on the second control message.

10. A method for wireless communications, at a second wireless device comprising:
transmitting, to a first wireless device, a set of reference signals via a set of transmit beams at the second wireless device;
receiving, from the first wireless device, a set of parameters indicating a set of complex gain values and a set of delay parameters associated with a set of receive beams and the set of transmit beams at the first wireless device based at least in part on the set of reference signals; and
transmitting, to the first wireless device, a message via a combined transmit beam corresponding to a set of beam weights associated with a coherent receive beam for the first wireless device based at least in part on the set of complex gain values and the set of delay parameters.

11. The method of claim 10, further comprising:
determining the set of beam weights associated with the coherent receive beam for the first wireless device based at least in part on the set of transmit beams and the set of parameters.

12. The method of claim 11, further comprising:
transmitting, to the first wireless device, a control message indicating the set of beam weights associated with the coherent receive beam for the first wireless device.

13. The method of claim 10, further comprising:
receiving, from the first wireless device, an indication of one or more signal to interference and noise ratios associated with the set of complex gain values and the set of delay parameters associated with one or more beam pairs; and
determining a spatial precoder based at least in part the indication of the one or more signal to interference and noise ratios associated with the set of complex gain values and the set of delay parameters associated with the one or more beam pairs.

14. The method of claim 13, wherein transmitting the message comprises:
transmitting the message in accordance with the spatial precoder.

15. The method of claim 10, further comprising:
receiving, from the first wireless device, an indication of one or more beam pairs associated with the set of receive beams, the combined transmit beam, and the set of transmit beams, the indication of the one or more beam pairs based at least in part on a respective measurement for each beam pair of a set of beam pairs and a first tap in a time domain.

16. The method of claim 15, further comprising:
receiving, from the first wireless device, a second set of complex gain values and a second set of delay parameters associated with one or more second taps, wherein the second set of complex gain values and the second set of delay parameters are based on measurements associated with the set of reference signals via one or more second taps in the time domain, the one or more second taps associated with inter symbol interference at the first wireless device.

17. The method of claim 16, further comprising:
determining the set of beam weights associated with the coherent receive beam for the first wireless device based at least in part on the second set of complex gain values and the second set of delay parameters.

18. An apparatus for wireless communications at a first wireless device, comprising:
a processor;
memory coupled with the processor; and
instructions stored in the memory and executable by the processor to cause the apparatus to:
receive, from a second wireless device and via a set of receive beams at the first wireless device, a set of reference signals associated with a set of transmit beams at the second wireless device;
transmit, to the second wireless device, a set of parameters indicating a set of complex gain values and a set of delay parameters associated with the set of receive beams and the set of transmit beams; and
receive, from the second wireless device, a message via a coherent receive beam at the first wireless device, the coherent receive beam based at least in part on the set complex gain values and the set of delay parameters associated with the set of receive beams and the set of transmit beams.

19. The apparatus of claim 18, wherein the instructions are further executable by the processor to cause the apparatus to:
receive, from the second wireless device, a control message indicating indices corresponding to a set of beam weights associated with the coherent receive beam for the first wireless device based at least in part on the set of parameters, wherein the message is received based at least in part on the set of beam weights.

20. The apparatus of claim 18, wherein the instructions are further executable by the processor to cause the apparatus to:
receive, from the second wireless device, a control message indicating a spatial precoding, the spatial precoding being applied based at least in part on the set of parameters, wherein the control message is received based at least in part on a set of beam weights.

21. The apparatus of claim 18, wherein the instructions are further executable by the processor to cause the apparatus to:
measure the set of reference signals received via the set of receive beams based at least in part on a first tap in a time domain; and determine one or more beam pairs associated with the set of receive beams and the set of transmit beams based at least in part on a respective measurement for each beam pair of a set of beam pairs associated with the set of receive beams and the set of transmit beams.

22. The apparatus of claim 21, wherein the instructions are further executable by the processor to cause the apparatus to:
determine the set of complex gain values and the set of delay parameters for the one or more beam pairs; and
transmit an indication of the one or more beam pairs to the second wireless device, the one or more beam pairs based at least in part on an energy of a strongest tap of the time domain, a ratio between the energy of the strongest tap of the time domain and a summation of energies of other taps, a signal to interference noise ratio, or some combination thereof.

23. The apparatus of claim 21, wherein the instructions are further executable by the processor to cause the apparatus to:
measure the set of reference signals received via the set of receive beams based at least in part on one or more second taps in the time domain, the one or more second taps associated with inter symbol interference at the first wireless device;
determine a second set of complex gain values and a second set of delay parameters associated with the one or more second taps; and
transmit, to the second wireless device, the second set of complex gain values and the second set of delay parameters associated with the one or more second taps.

24. The apparatus of claim 23, wherein the coherent receive beam is associated with a set of beam weights based at least in part on the second set of complex gain values and the second set of delay parameters.

25. The apparatus of claim 18, wherein the instructions are further executable by the processor to cause the apparatus to:
receive, from a third wireless device and via the set of receive beams of the first wireless device, a second set of reference signals associated with a third set of beams of the third wireless device;
transmit, to the third wireless device, a second set of parameters indicating a second set of complex gain values and a second set of delay parameters associated with the set of receive beams;
receive, from the third wireless device, a second control message indicating indices corresponding to a second set of beam weights associated with the coherent receive beam based at least in part on the second set of parameters; and
receive, from the third wireless device, at least a portion of the message via the coherent receive beam based at least in part on the second control message.

26. The apparatus of claim 18, wherein the instructions are further executable by the processor to cause the apparatus to:
receive, from a third wireless device and via the set of receive beams of the first wireless device, a second set of reference signals associated with a third set of beams of the third wireless device;
transmit, to the third wireless device, a second set of parameters indicating a second set of complex gain values and a second set of delay parameters associated with the set of receive beams and the third set of beams;
receive, from the third wireless device, a second control message indicating a second spatial precoding, the second spatial precoding being applied based at least in part on the second set of parameters, wherein the second control message is received based at least in part on a set of beam weights; and
receive, from the third wireless device, at least a portion of the message via the coherent receive beam based at least in part on the second control message.

27. An apparatus for wireless communications, comprising:
a processor;
memory coupled with the processor; and
instructions stored in the memory and executable by the processor to cause the apparatus to:
transmit, to a first wireless device, a set of reference signals via a set of transmit beams at a second wireless device;
receive, from the first wireless device, a set of parameters indicating a set of complex gain values and a set of delay parameters associated with a set of receive beams and the set of transmit beams at the first wireless device based at least in part on the set of reference signals; and
transmit, to the first wireless device, a message via a combined transmit beam corresponding to a set of beam weights associated with a coherent receive beam for the first wireless device based at least in part on the set of complex gain values and the set of delay parameters.

28. The apparatus of claim 27, wherein the instructions are further executable by the processor to cause the apparatus to:
determine the set of beam weights associated with the coherent receive beam for the first wireless device based at least in part on the set of transmit beams and the set of parameters.

29. The apparatus of claim 28, wherein the instructions are further executable by the processor to cause the apparatus to:
transmit, to the first wireless device, a control message indicating the set of beam weights associated with the coherent receive beam for the first wireless device.

30. The apparatus of claim 27, wherein the instructions are further executable by the processor to cause the apparatus to:
receive, from the first wireless device, an indication of one or more signal to interference and noise ratios associated with the set of complex gain values and the set of delay parameters associated with one or more beam pairs; and
determine a spatial precoder based at least in part the indication of the one or more signal to interference and noise ratios associated with the set of complex gain values and the set of delay parameters associated with the one or more beam pairs.

* * * * *